US007472427B2

United States Patent
Shimojima et al.

(10) Patent No.: US 7,472,427 B2
(45) Date of Patent: Dec. 30, 2008

(54) CONTENT MANAGEMENT METHOD AND CONTENT MANAGEMENT APPARATUS

(75) Inventors: Takashi Shimojima, Tokyo (JP); Mitsuhiro Sato, Atsugi (JP); Naohiko Noguchi, Yokohama (JP); Shinichi Matsui, Kobe (JP); Ryuji Inoue, Minoo (JP); Kaoru Murase, Ikoma-gun (JP); Shunji Harada, Osaka (JP)

(73) Assignee: Panasonic Corporation, Osaka (JP)

( * ) Notice: Subject to any disclaimer, the term of this patent is extended or adjusted under 35 U.S.C. 154(b) by 726 days.

(21) Appl. No.: 10/482,161

(22) PCT Filed: Jul. 2, 2002

(86) PCT No.: PCT/JP02/06667

§ 371 (c)(1),
(2), (4) Date: Jan. 5, 2004

(87) PCT Pub. No.: WO03/005207

PCT Pub. Date: Jan. 16, 2003

(65) Prior Publication Data

US 2004/0225612 A1 Nov. 11, 2004

(30) Foreign Application Priority Data

Jul. 6, 2001 (JP) ............................... 2001-206491

(51) Int. Cl.
*G06F 21/00* (2006.01)
(52) U.S. Cl. .............................. 726/31; 726/26; 726/32; 726/33; 380/201; 380/202; 380/203
(58) Field of Classification Search ............. 726/31–33, 726/26; 380/201–203
See application file for complete search history.

(56) References Cited

U.S. PATENT DOCUMENTS 5,991,500 A * 11/1999 Kanota et al. ................. 386/94

(Continued)

FOREIGN PATENT DOCUMENTS

EP 1049087 2/2000

(Continued)

OTHER PUBLICATIONS

English Language Abstact of JP 2001-118332.

(Continued)

*Primary Examiner*—Kambiz Zand
*Assistant Examiner*—Tongoc Tran
(74) *Attorney, Agent, or Firm*—Greenblum & Bernstein, P.L.C.

(57) ABSTRACT

With content management apparatus 110 serving as a copy origin and storage medium 120 as a copy target, the copy origin retains allowed copy count control information on content, and when the content is copied from the copy origin to the copy target, the allowed copy count control information retained at the copy origin before copy processing is updated in accordance with a predetermined rule to generate allowed copy count control information to be retained at the copy origin and allowed copy count control information to be retained at the copy target, and subsequent copy processing at the copy origin is done based on the allowed copy count control information retained at the copy origin, whereas subsequent copy processing on the content stored in storage medium 120 is done based on the allowed copy count control information stored in storage medium 120. In this way, it is possible to achieve content management which is easily understandable for users.

25 Claims, 21 Drawing Sheets

U.S. PATENT DOCUMENTS

| | | |
|---|---|---|
| 6,687,802 B1 | 2/2004 | Kori et al. |
| 6,748,485 B1 * | 6/2004 | Yokota et al. ............... 711/112 |
| 6,859,790 B1 * | 2/2005 | Nonaka et al. ............... 705/51 |
| 6,989,484 B2 * | 1/2006 | Gross .......................... 84/609 |
| 7,266,202 B1 | 9/2007 | Kawakami et al. |
| 2006/0047978 A1 | 3/2006 | Kawakami et al. |

FOREIGN PATENT DOCUMENTS

| | | |
|---|---|---|
| EP | 1014361 | 6/2000 |
| EP | 1045388 | 10/2000 |
| EP | 1069772 | 1/2001 |
| EP | 1096388 | 5/2001 |
| EP | 1096499 | 5/2001 |
| EP | 1111530 | 6/2001 |
| JP | 2000-293589 | 10/2000 |
| JP | 2000-315177 | 11/2000 |
| JP | 2000-330870 | 11/2000 |
| JP | 2001-14221 | 1/2001 |
| JP | 2001-69986 | 3/2001 |
| JP | 2001-94930 | 4/2001 |
| JP | 2001-118332 | 4/2001 |
| JP | 2001-344437 | 12/2001 |
| WO | 00/62217 | 10/2000 |

OTHER PUBLICATIONS

English Language Abstact of JP 2000-293589.
English Language Abstact of JP2001-14221.
English Language Abstact of JP2001-94930.
English Language Abstact of JP 2000-330870.
English Language Abstact of JP 2001-66986.
English Language Abstact of JP2000-315177.
English Language Abstact of JP 2001-344437.

* cited by examiner

CONTENT MANAGEMENT METHOD AND CONTENT MANAGEMENT APPARATUS

TECHNICAL FIELD

The present invention relates to a content management method for managing copyrighted content which is put into an electronic form and an apparatus for implementation thereof, and in particular, the present invention makes it possible to manage content with a restriction imposed on copying and moving thereof in an easily understandable form to users.

BACKGROUND ART

Recently, there has been an increasing demand for digital content distribution services making use of communications or broadcasting.

For example, music distribution services have now started to be provided, such as one in which music data is downloaded to a cellular phone to be stored into a storage medium connected thereto, and the music data is played back on the cellular phone or other playback device whenever it is demanded. In addition, other than music data, a distribution service for video data such as a movie, etc., or document data such as newspaper accounts, etc., has also been conceived.

In a system which distributes content electronically, it is an important issue how to prevent unauthorized use of stored content or unauthorized copying thereof from occurring for the protection of a right of a copyright holder. Though it goes without saying that it is necessary to provide a scheme which eliminates the risk of unauthorized copying or tampering, especially, these days, there has been a growing importance of a freer content use control scheme which also controls number of times of content viewing.

As a conventional digital content use control scheme, the invention described in Japanese Laid-Open Patent Publication No. 2000-315177 (hereafter referred to as the conventional scheme) is known.

An explanation is given below on the outline of the conventional scheme. The conventional scheme is a content management method for restricting the number of content copies copied into storage media, where an allowed number of copies k is set for each of content, and a restriction is imposed on the copying of content so that the number of storage media in which the content is copied does not exceed k at the same time.

FIG. 1 illustrates a conceptual diagram of a content use model according to the conventional scheme where k=3. A content use management system (PC) stores the allowed number of copiable content for each of content and identification information of storage media where copied content are stored (as an accommodation book). Upon reception of instructions for copying and storing of distributed content into a storage medium, a copied content is stored into the storage medium in a case where there is a remaining balance in the allowed number of copiable content for this content. At such an occasion, each time a copied content is stored into storage medium, the allowed number of copiable content is decremented by one (check-out).

In addition, upon the reception of instructions for erasing of copied content from the storage medium, the copied content is erased from the storage medium, and the allowed number of copiable content is incremented by one at each time of erasing a copied content (check-in). At such an occasion, only in a case where the identification information of the storage medium is stored in the "accommodation book", the copied content is erased from the storage medium.

In an example of FIG. 1, because a predetermined allowed number of copiable content k for content is "3", it is possible to perform checkouts to three storage media at the maximum at the same time. Furthermore, the allowed number of copiable content is incremented by one by checking in checked-out content, therefore it is possible to perform a checkout to another storage medium.

In addition, in this content use model, content which is checked out to a storage medium is unable to be checked into another content use management system other than the original content use management system from which the content is checked out.

In this way, according to this system, it is possible to impose strict limitations on copied content through management of check-ins and checkouts.

However, it is often that a content use management scheme by means of check-ins and checkouts, especially its concept of check-in, is hard for users to become familiar with it, ending up being a cause of a hindrance to making content distribution services popular.

Moreover, according to a check-in/checkout scheme, it is difficult to embody a control mode which restricts the viewing count of content, etc., by affixing use restriction information which prescribes the allowed playback count of the content, etc., to the content. For example, in a case where a checkout to a storage medium is performed with use restriction information which restricts the allowed playback count of content affixed thereto, the following problem would arise.

By playing back copied content in a storage medium, the allowed playback count of the content decreases, meanwhile, by playing the content back, the allowed playback count at a content use management system side also varies in accordance with its number of times of playbacks. In this way, due to the difference in the number of times of playbacks after checkout, there is a discrepancy between the value of the allowed playback count of the content at the content use management system side and the value of the allowed playback count of the content at the storage medium side. For this reason, there arises a problem regarding which value the allowed playback count should be adjusted to when checking content at the storage medium side in. In addition, regardless of which value it is adjusted to, it is inevitable that such a content use model would be far harder one to be understood by users, as well as the greater complexity in processing on equipment.

DISCLOSURE OF INVENTION

The object of the present invention is to solve such conventional problems, aiming to provide a content management method and an apparatus for implementation thereof which manages content in an easily understandable form for users, and also manages the copying and moving of content with use restriction information affixed thereto.

This object is achieved by updating additional information of content at the time of the copying and moving of the content, and having the management of the copying and moving of the content thereafter be performed by equipment which handles the content based on the updated additional information.

BEST MODE FOR CARRYING OUT THE INVENTION

Embodiments of the present invention will be described below. Incidentally, the present invention is in no case limited to these embodiments; the present invention is able to be exploited in various kinds of modes within the range where the gist of the present invention is maintained.

EMBODIMENT 1

In Embodiment 1, a content management system which manages the copying of content is explained.

Figure 1:
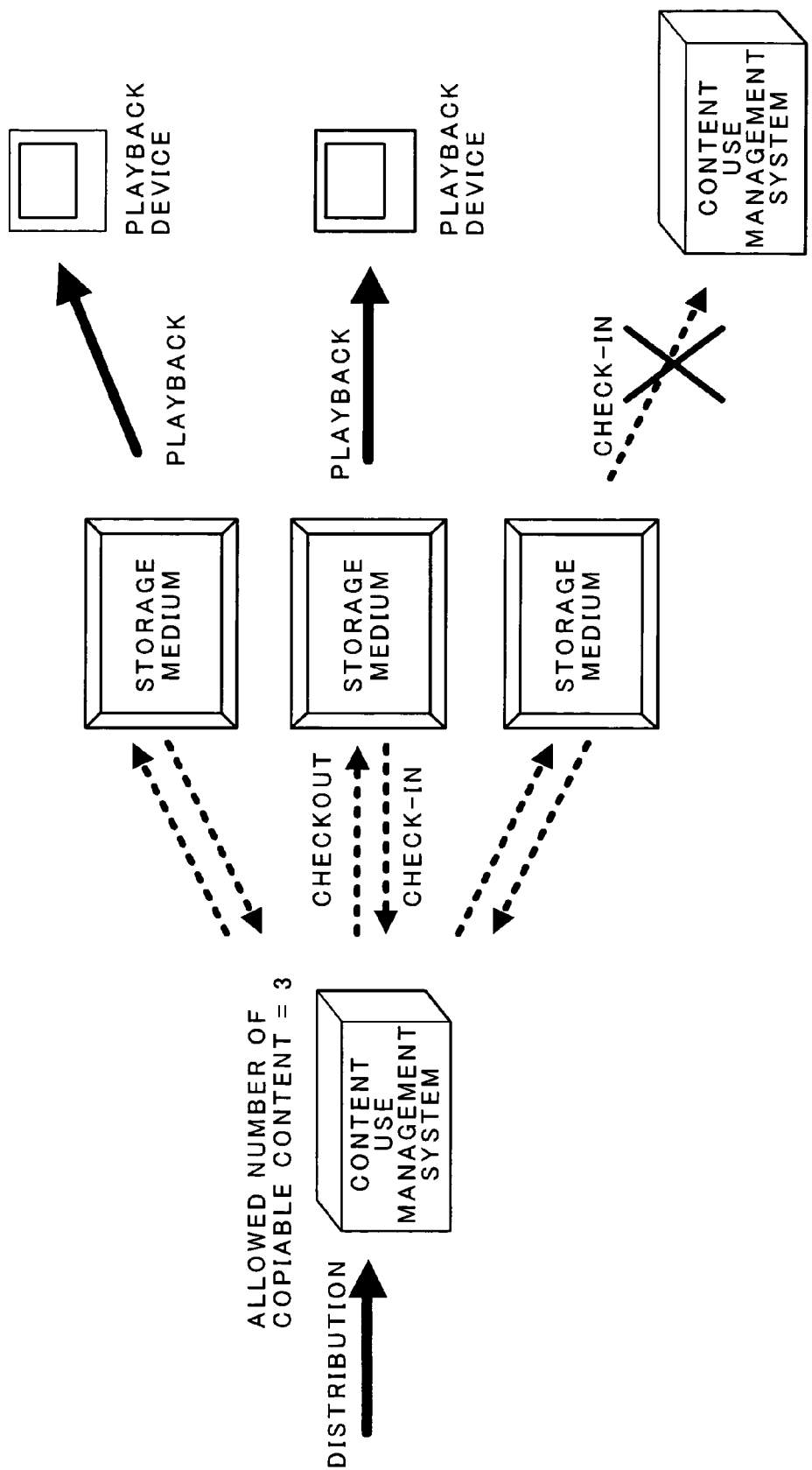
FIG. 1 is a conceptual diagram illustrating a content use model according to the conventional scheme.
Figure 2:
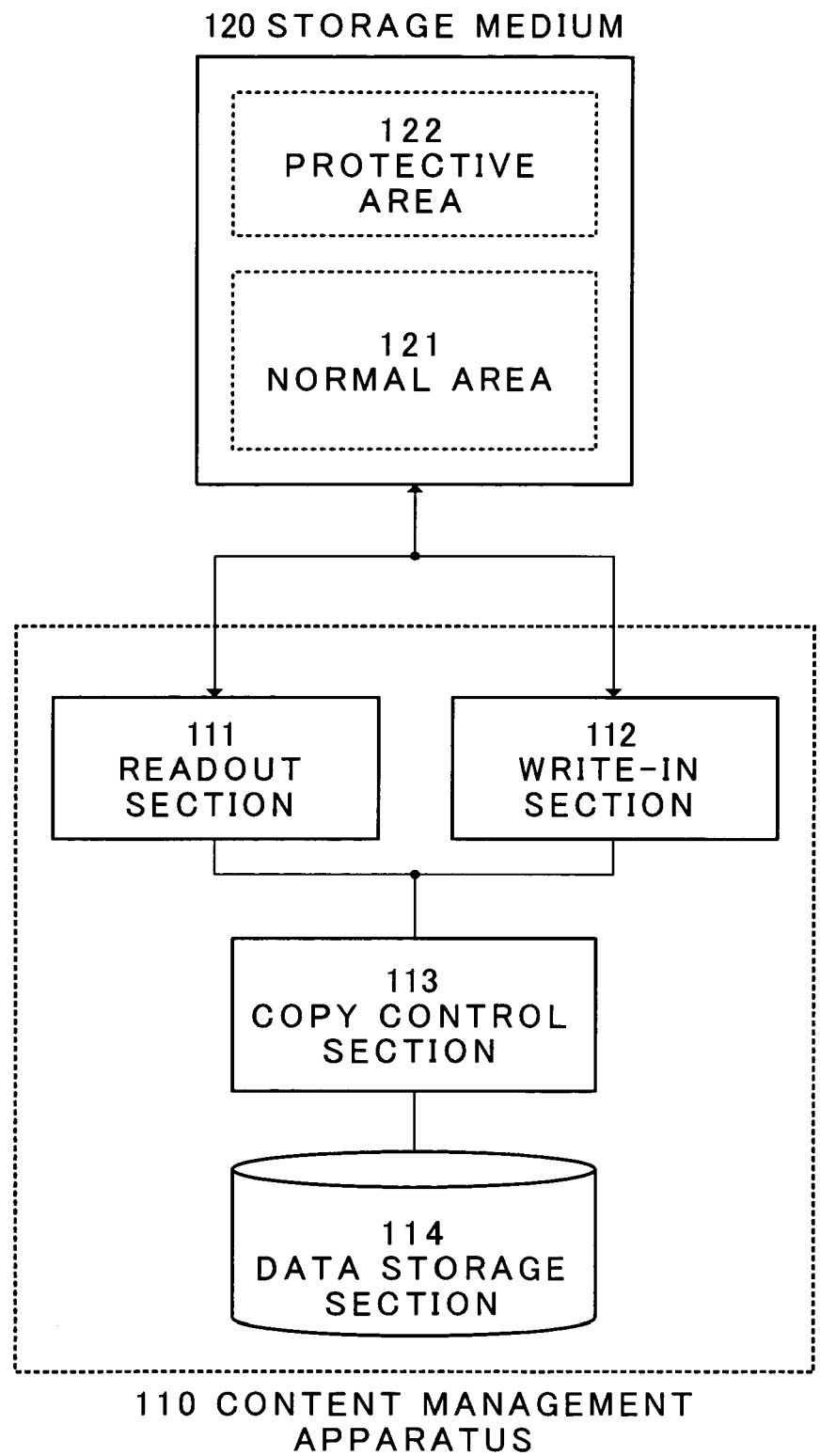
FIG. 2 is a configuration diagram of a content management system according to Embodiment 1 of the present invention.

As illustrated in FIG. 2, this system comprises storage medium 120 in which content is stored, and content management apparatus 110 which controls the storing and copying of the content.

Content management apparatus 110 has readout section 111 that reads data out of storage medium 120, write-in section 112 that writes data into storage medium 120, copy control section 113 that controls content copy processing from content management apparatus 110 to storage medium 120, and content copy processing from storage medium 120 to content management apparatus 110, and data storage section 114 that stores content and various additional information for the content.

In addition, storage medium 120 has normal area 121 which is used for the storing of content, and protective area 122 which is used for the storing of various additional information for the content stored in normal area 121. This protective area 122 is a special area which is protected so that a user will not be able to execute write-in/readout thereon directly.

In this system, content stored in storage medium 120 is copied to be stored into data storage section 114 of content management apparatus 110, or content stored in data storage section 114 of content management apparatus 110 is copied to be stored into storage medium 120.

The copying of content is managed based on additional information of the content. When content is copied, additional information retained in a copy origin is subjected to updating in accordance with a predetermined rule, and also additional information updated in accordance with a predetermined rule is retained at a copy target. For example, in a case where the content stored in data storage section 114 of content management apparatus 110 is copied into storage medium 120, the additional information stored in data storage section 114 of the copy origin is updated, whereas additional information updated in accordance with the predetermined rule is also stored in protective area 122 of storage medium 120 of the copy target.

The approval/disapproval of further copying of the content stored in storage medium 120 is managed by the additional information stored in storage medium 120. At this occasion, unlike the conventional scheme, content management apparatus 110 at the copy origin does not get involved in the management of the content after copying at all. Content management apparatus 110 just performs a new copying of the content stored in data storage section 114 based on the updated additional information.

This copy processing according to additional information and updating processing of the additional information is executed by copy control section 113 of content management apparatus 110. The operation of copy control section 113 is implemented by a program for having a computer function as copy control section 113.

Next, using a specific example, the 1$^{st}$ content use model according to this embodiment and processing of a content management system with such a model is explained. The 1$^{st}$ content use model is a model which disables further copying of copied content.

First of all, content management apparatus 110 acquires distributed content and its additional information with use of some means, and stores them into data storage section 114. This acquisition may be done through wired or wireless data communications means, or with use of broadcasting reception means. Alternatively, they may be loaded from an information storage medium.

Figure 3:
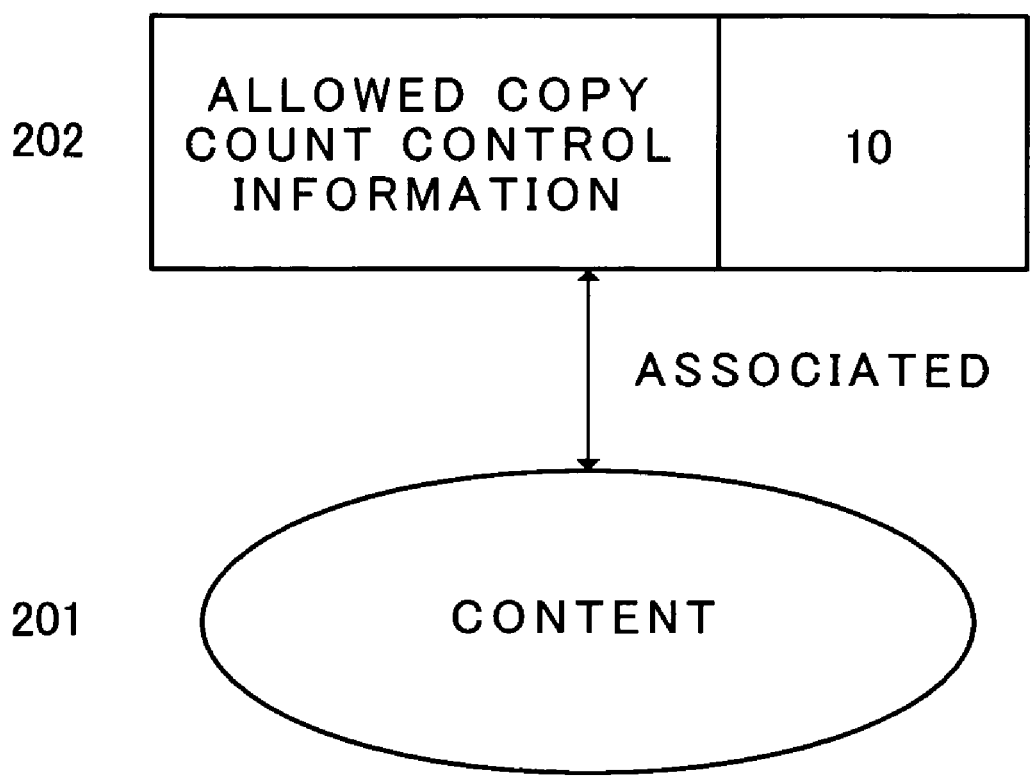
FIG. 3 is a diagram illustrating one example of content acquired by a content management apparatus and its additional information for a case of the $1^{st}$ content use model according to Embodiment 1 of the present invention.

FIG. 3 is a diagram illustrating one example of content 201 and its additional information 202 acquired by content management apparatus 110. Various kinds of content are conceivable, such as music data, video data, image data, document data, and so forth, and the type of content is not specifically confined herein. In addition, as additional information, allowed copy count control information is associated with content. The allowed copy count control information is information which represents how many copies are allowed to be created out of the associated content. Here, the allowed copy count is taken to be 10.

It is noted that content 201 and additional information 202 stored in data storage section 114 is assumed to be stored securely so that it cannot be tampered by any user. As its storage method, it is conceivable to employ the secure management achieved by means of tamper-resistant software or the encryption using ID which is unique to the hardware of content management apparatus 110 and so forth, and its method is not specifically confined herein.

Figure 4:
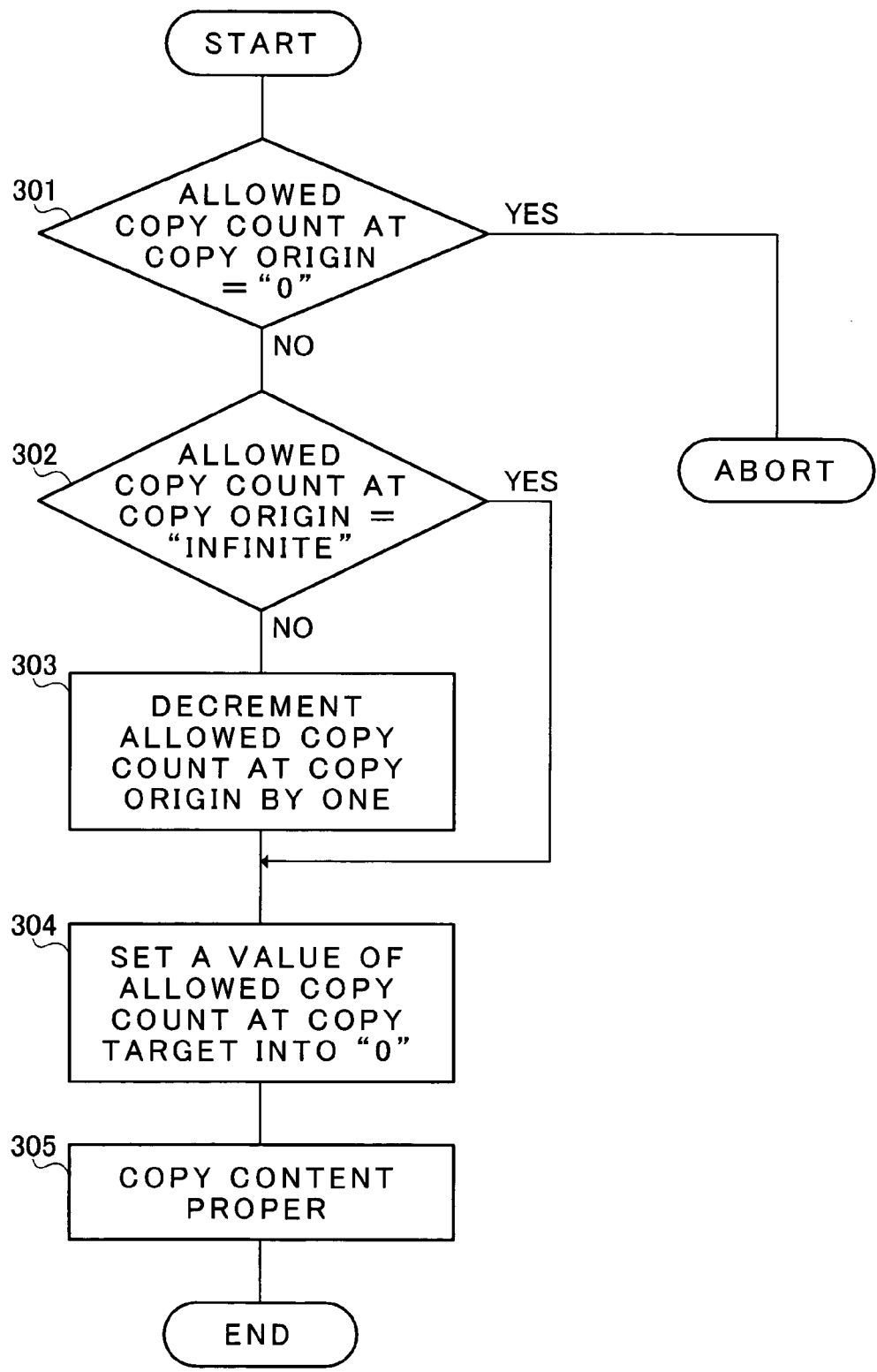
FIG. 4 is a diagram illustrating the processing flow of content copying at a copy control section for a case of the $1^{st}$ content use model according to Embodiment 1 of the present invention.

Next, an explanation is given on processing at copy control section 113 in a case where instructions are given by a user for copying content 201 stored in content management apparatus 110 into storage medium 120. FIG. 4 is a diagram illustrating the processing flow of content copying at copy control section 113 in such a case.

Step 301: Allowed copy count control information at a copy origin is referred to, and if the allowed copy count is 0, the processing is aborted. In the case of this example (FIG. 3), because the allowed copy count associated with content 201 is "10", the processing goes to step 302 without aborting.

Step 302: In a case where the allowed copy count control information at the copy origin is "infinite", the processing skips step 303 to move onto step 304. Because it is not a value indicating "infinite" in the case of this example, the processing goes to step 303.

Step 303: The allowed copy count at the copy origin is decremented by one. In the case of this example, the allowed copy count is decremented from "10" to "9" and it is set again.

Step 304: The allowed copy count at the copy target is set into "0." In the case of this example, the allowed copy count is set as "0" at protective area 122 of storage medium 120 which is the copy target.

Step 305: Content proper is copied into the copy target. In the case of this example, a copy of content 201 stored in data storage section 114 of content management apparatus 110 is stored in normal area 121 of storage medium 120 which is the copy target. At such an occasion, the content is subjected to encryption for storage so that it will not be able to be used, copied, and exploited in other way, without due authorization. A content encryption key used in such an occasion is stored in protective area 122.

Figure 5:
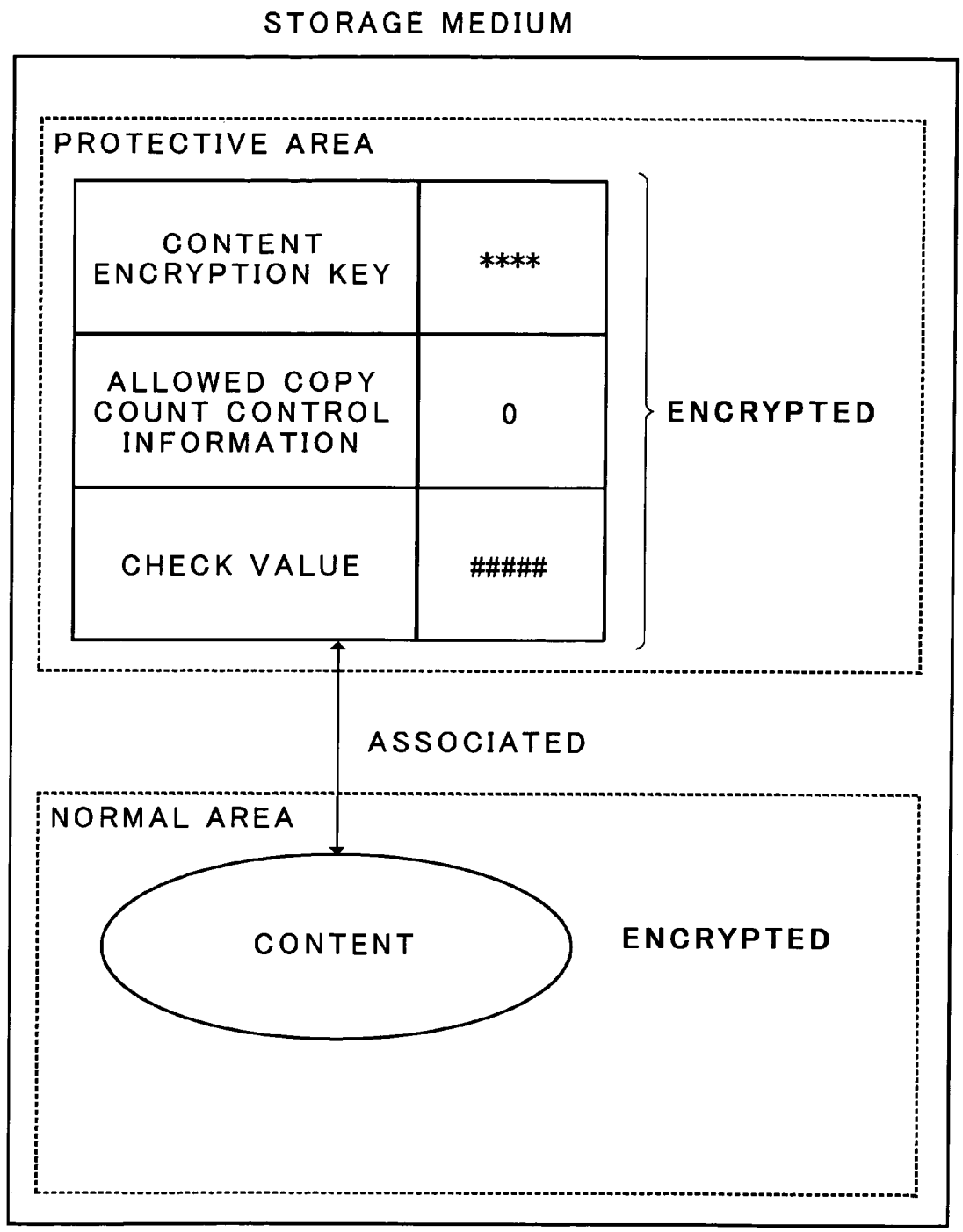
FIG. 5 is a diagram illustrating the structure of data stored in a storage medium after a copy processing stage for a case of the $1^{st}$ content use model according to Embodiment 1 of the present invention.

FIG. 5 is a diagram illustrating the configuration of data stored in a storage medium after a copy processing stage in this example. As illustrated in FIG. 5, it is also possible to enhance security against an attack from a malicious user by bringing the allowed copy count control information and an encryption key for encrypting the content proper together and by encrypting them using an encryption key unique to the storage medium to store them into protective area 122. Moreover, at the time of encryption and storing into the protection area, it is possible to further heighten security by performing encryption and storage with a check value for detecting the tampering of information inserted therein.

Figure 6:
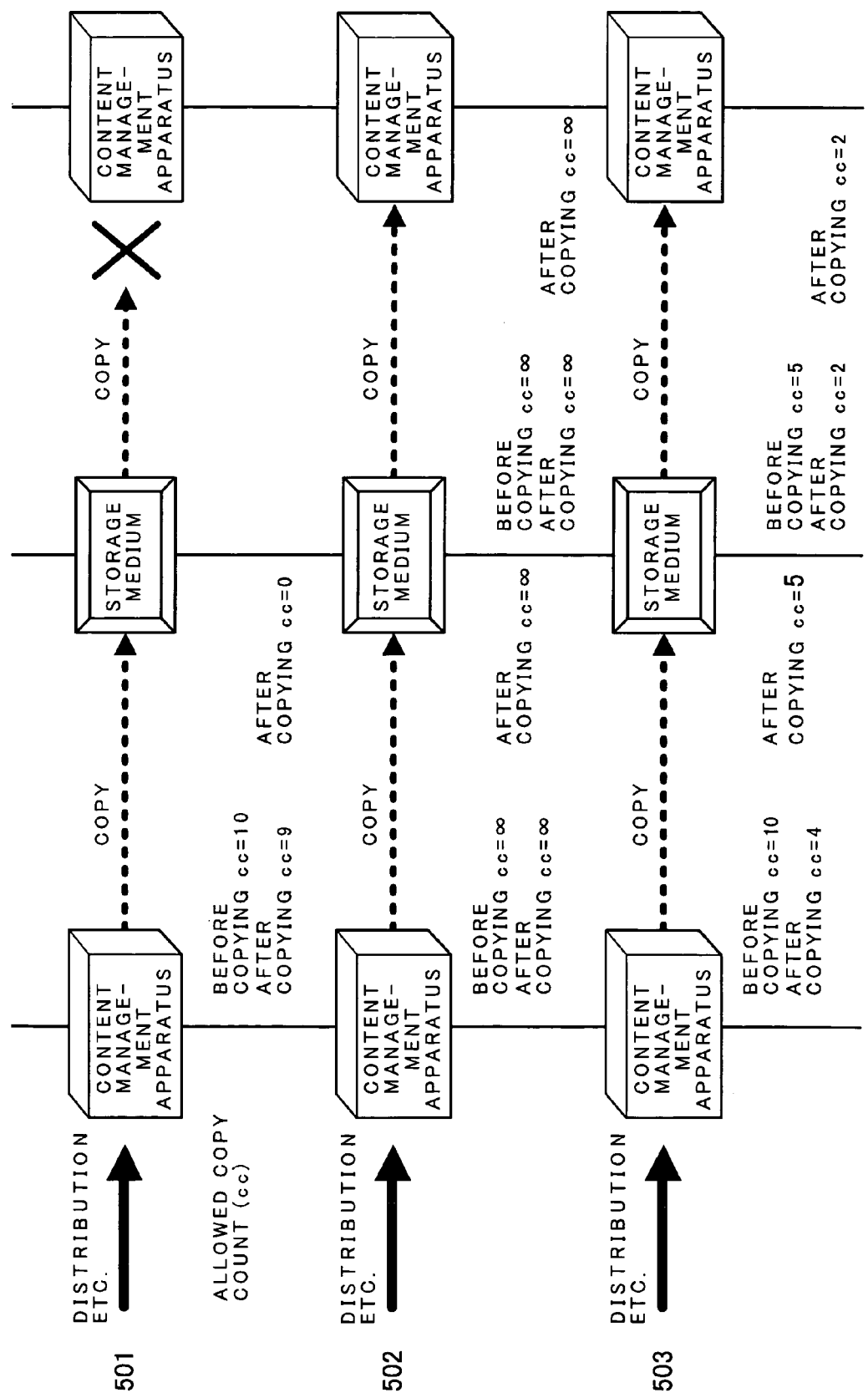
FIG. 6 is a conceptual diagram illustrating a content use model according to Embodiment 1 of the present invention.

Reference numeral 501 in FIG. 6 shows a conceptual diagram of the 1$^{st}$ content use model in this embodiment. As illustrated with reference numeral 501 of FIG. 6, the 1$^{st}$ content use model according to this embodiment is a model which disables the further copying of content from the copy target (hereafter referred to as a sub-copy), achieved by setting the allowed copy count control information at the copy target into a value indicating that the further copying is disabled.

It is noted that, according to the content copy processing flow illustrated in FIG. 4, in a case where the allowed copy count at the copy origin is other than "0", the allowed copy count control information at the copy target is always set at step 304 into a value indicating that further copying is disabled, which prohibits a sub-copy, however, it is possible to realize another content use model which allows infinite copying as illustrated with reference numeral 502 in FIG. 6 by setting the allowed copy count of the copy target into a value indicating "infinite" in a case where the allowed copy count of the copy origin is a value indicating "infinite" in step 302.

Next, using a specific example, the 2$^{nd}$ content use model according to this embodiment and processing of a content management system with such a model is explained. The 2$^{nd}$ content use model is a model which manages the aggregate number of copies.

Figure 7:
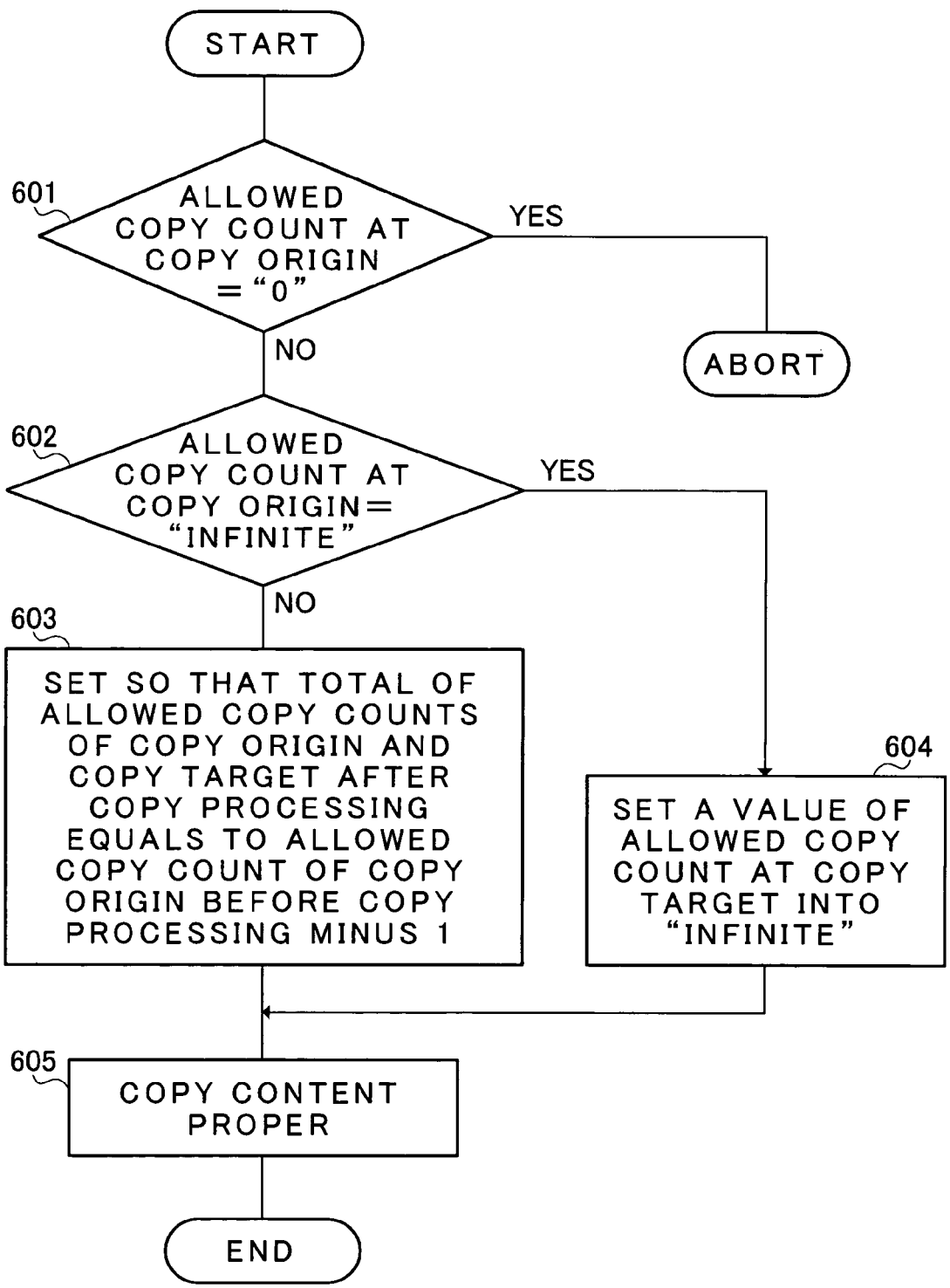
FIG. 7 is a diagram illustrating the processing flow of content copying at a copy control section for a case of the $2^{nd}$ content use model according to Embodiment 1 of the present invention.

Here, in the same manner as done in the explanation of the 1$^{st}$ content use model, an explanation is given on processing at copy control section 113 in a case where instructions are given by a user for copying content 201 stored in content management apparatus 110 into storage medium 120. FIG. 7 is a diagram illustrating the processing flow of content copying at copy control section 113 in a case of the 2$^{nd}$ content use model.

Step 601: In a case where the allowed copy count of the copy origin is not "0" as in the same manner as step 301 of FIG. 4, Step 602: In a case where the allowed copy count control information at the copy origin is "infinite", the processing goes to step 604; otherwise it goes to step 603. Because it is not a value indicating "infinite" in the case of this example, the processing goes to step 603.

Step 603: The values of allowed copy count restriction information at the copy origin and at the copy target are set so that the total of the allowed copy counts of the copy origin and the copy target after copy processing equals to the allowed copy count of the copy origin before the copy processing minus 1. In the case of this example, because the allowed copy count at the copy origin before the copy processing is "10", and "10−1=9", the values after the copy processing are set in such a manner that, for example, the allowed copy count at the copy origin is "4", while the allowed copy count at the copy target is "5." Herein, how the allowed copy count is allocated is supposed to be specified by an input by a user.

Step 604: In a case where the allowed copy count control information at the copy origin is "infinite" in step 602, the value of the allowed copy count control information at the copy target is also set as "infinite."

Step 605: In the same manner as done in step 305 of FIG. 4, content proper is copied into the copy target.

Reference numeral 503 in FIG. 6 shows a conceptual diagram of the $2^{nd}$ content use model in this embodiment. As illustrated with reference numeral 503 in FIG. 6, the $2^{nd}$ content use model is a model which is able to manage the total number of copies in a case where repetitive copying of distributed content is performed within a range restricted by allowed copy count control information, which is achieved by setting the values of allowed copy count restriction information at the copy origin and at the copy target at the time of copy execution so that the total of the allowed copy counts of the copy origin and the copy target becomes equal to the allowed copy count of the copy origin before the copy processing minus 1.

It is noted that, in the content copy processing flow illustrated in FIG. 7, the value of the allowed copy count at the copy target is set to be "infinite" at step 604 in a case where the value of the allowed copy count at the copy origin is a value indicating "infinite" at step 602, however, it is also possible herein to conceive a model which confines the origin of copy dissemination to a single content with infinite number of total copies, which is achieved by setting either one of the allowed copy count at the copy origin or at the copy target to be "infinite", while the other one being set as "0."

Next, using a specific example, the $3^{rd}$ content use model according to this embodiment and processing of a content management system with such a model is explained. The $3^{rd}$ content use model is a model which specifies up to how many generations downward copying is allowed.

Figure 8:
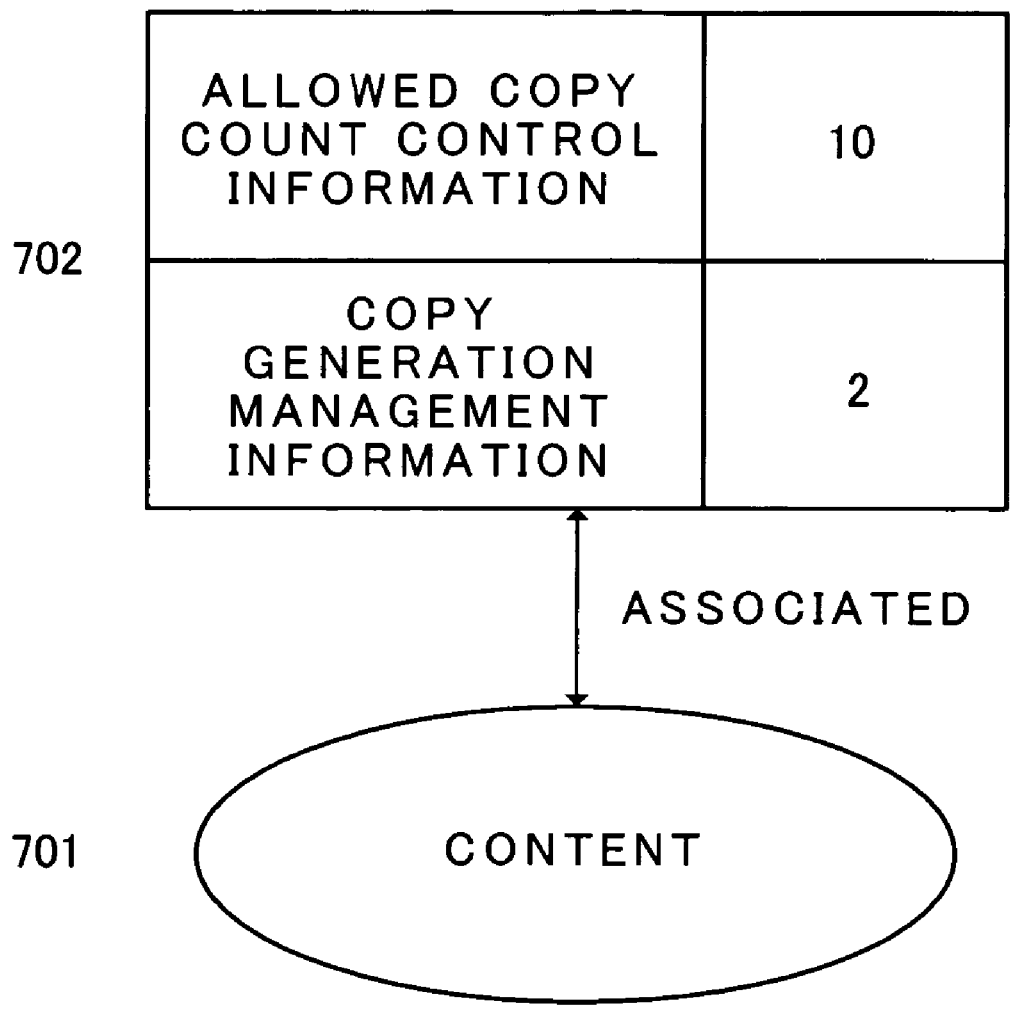
FIG. 8 is a diagram illustrating one example of content acquired by a content management apparatus and its additional information for a case of the $2^{nd}$ content use model according to Embodiment 1 of the present invention.

Here, an explanation is given on processing at copy control section 113 in a case where instructions are given by a user for copying content 701 of FIG. 8 into storage medium 120 on the assumption that data as illustrated in FIG. 8 is stored securely in data storage section 114 of content management apparatus 110.

Figure 9:
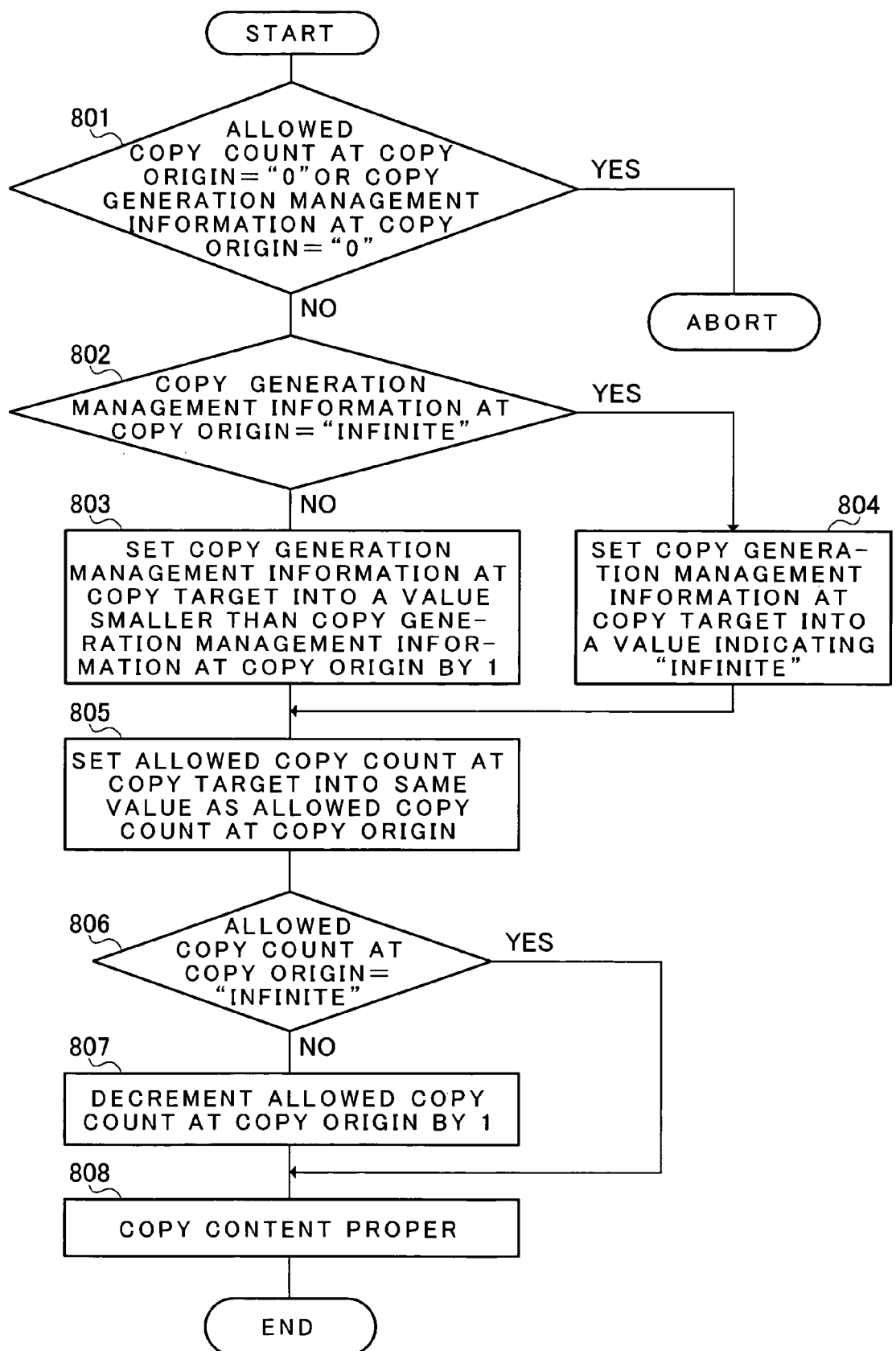
FIG. 9 is a diagram illustrating the processing flow of content copying at a copy control section for a case of the $3^{rd}$ content use model according to Embodiment 1 of the present invention.

As its additional information, copy generation management information is newly associated with content 701 illustrated in FIG. 8. The copy generation management information is information which represents up to how many generations copies are allowed to be created out of the associated content. FIG. 9 is a diagram illustrating the processing flow of content copying at copy control section 113 in a case of the $3^{rd}$ content use model according to this embodiment.

Step 801: Allowed copy count control information and copy generation management information at a copy origin are referred to, and if either one is "0", or the both are "0", the processing is aborted. Because neither of them is "0" in the case of this example, the processing goes to step 802.

Step 802: In a case where the copy generation management information at the copy origin is "infinite", the processing goes to step 804; otherwise it goes to step 803. Because it is not a value indicating "infinite" in the case of this example, the processing goes to step 803.

Step 803: The copy generation management information at the copy target is set into a value which is smaller than the copy generation management information at the copy origin by 1. In the case of this example, as the copy generation management information at the copy origin is "2", the copy generation management information at the copy target is set to be "1", and the set information is stored into protective area 122 of storage medium 120 which is the copy target.

Step 804: In a case where the copy generation management information at the copy origin is "infinite" in step 802, the value of the copy generation management information at the copy target is also set as "infinite."

Step 805: The allowed copy count at the copy target is set into the same value as the allowed copy count at the copy origin. In the case of this example, the allowed copy count at the copy origin "10" is set without any change as the allowed copy count at the copy target, and it is stored into protective area 122.

Step 806: In a case where the allowed copy count control information at the copy origin is "infinite", the processing skips step 807 to move onto step 808. Because it is not a value indicating "infinite" in the case of this example, the processing goes to step 807.

Step 807: The allowed copy count at the copy origin is decremented by one. In the case of this example, the allowed copy count is decremented from "10" to "9" and it is set again.

Step 808: In the same manner as done in step 305 of FIG. 4, content proper is copied into the copy target.

Figure 10:
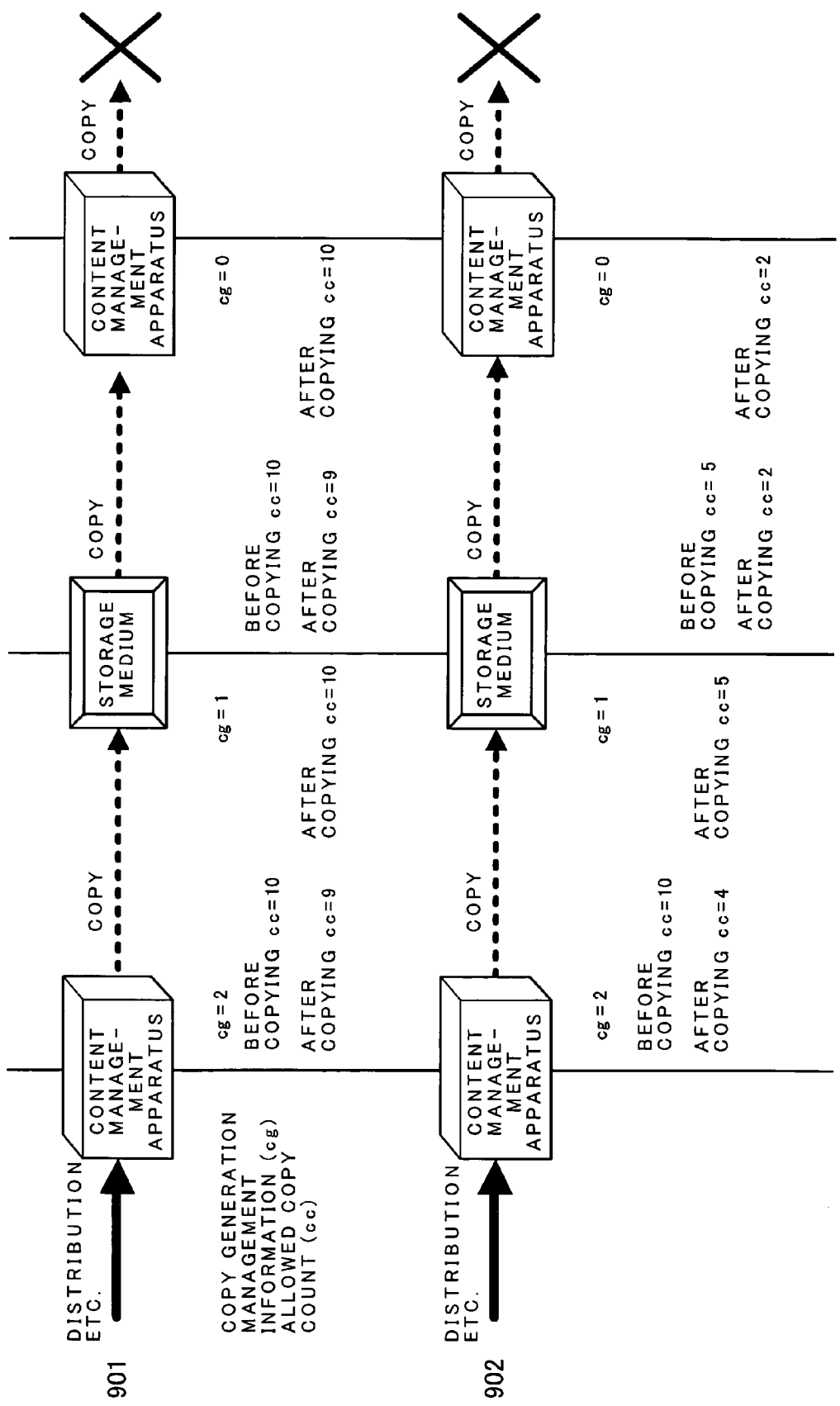
FIG. 10 is a conceptual diagram illustrating the $3^{rd}$ content use model according to Embodiment 1 of the present invention.

Reference numeral 901 in FIG. 10 shows a conceptual diagram of the $3^{rd}$ content use model in this embodiment. As illustrated with reference numeral 901 in FIG. 10, the $3^{rd}$ content use model according to this embodiment is a model which disables copying thereafter at the time when the value of the content generation management information reaches to "0", which realizes copy generation management of distributed content.

It is noted that, according to the content copy processing flow illustrated in FIG. 9, the allowed copy count at the copy target is set to be the same value as the allowed copy count at the copy origin in step 805, and the allowed copy count at the copy origin is subsequently decremented by one, however, as in step 603 of the $2^{nd}$ content use model, it is also possible to implement a content use model which sets the values of allowed copy counts at the copy origin and at the copy target so that the total of the allowed copy counts of the copy origin and the copy target after copy processing becomes equal to the allowed copy count of the copy origin before the copy processing minus 1 (refer to reference numeral 902 in FIG. 10).

As described above, according to a content management system of this embodiment, it is possible to control the number of times of copying of distributed content by managing the allowed copy count information on the content and by updating the allowed copy count of the copy origin so that it becomes smaller than before copy processing. Furthermore, it is possible to implement a content use model which prohibits a sub-copy by setting the allowed copy count control information at the copy target into a value indicating that copying is disabled.

In addition, it is possible to implement a content use model which is able to manage the total number of copies in a case where repetitive copying of distributed content is performed within a range restricted by allowed copy count control information, which is achieved by setting the values of allowed copy count restriction information at the copy origin and at the copy target at the time of copy execution so that the total of the allowed copy counts of the copy origin and the copy target becomes equal to the allowed copy count at the copy origin before the copy processing minus 1.

Moreover, it is possible to realize copy generation management of content by managing copy generation management information on the content and by setting the copy generation management information at the copy target to be smaller than the copy generation management information at the copy origin.

It is noted that, though it is assumed in the explanation given in this embodiment that allowed copy count control information and copy generation management information are counters whose values decrease at each time of copying, these may be implemented with a method in which each counter has two values, which are the maximum value and current value, where the current value is increased at each time of copying, and copying is then disabled at the time when the current value becomes equal to the maximum value.

Alternatively, allowed copy count control information may be flags indicating statuses, for example, indicating (1) copy disabled (2) copying allowed only once (3) copying allowed infinitely, instead of a counter like the above.

In addition, copy generation management information may also be flags indicating statuses, for example, indicating (1) copy disabled (2) copying allowed across only one generation (3) copying allowed across infinite generations, instead of a counter like the above.

It is noted that, in this embodiment, an explanation is provided on the assumption that a content management apparatus is a copy origin, whereas a storage medium is a copy target, however, it is also possible to implement copy processing in which a storage medium is a copy origin, whereas a content management apparatus is a copy target, achieved by managing allowed copy count control information and copy generation management information according to the same rules as described above at the copy origin and the copy target.

Additionally, though the copying of content proper is performed at the last step respectively according to the copy processing flows illustrated in FIG. 4, FIG. 7, and FIG. 9, the copying of the content proper may be performed at the first step each. Even at such an occasion, the content is subjected to encryption for storage so that there is no risk of use, copying, and exploitation in other way without due authorization.

EMBODIMENT 2

In Embodiment 2, a content management system which manages the moving of content is explained. Incidentally, the moving processing of content means that content subjected to moving processing is not retained (thus unusable) at its move source, and upon execution of the moving processing, content use becomes available only at its move destination out of the move source and the move destination.

Figure 11:
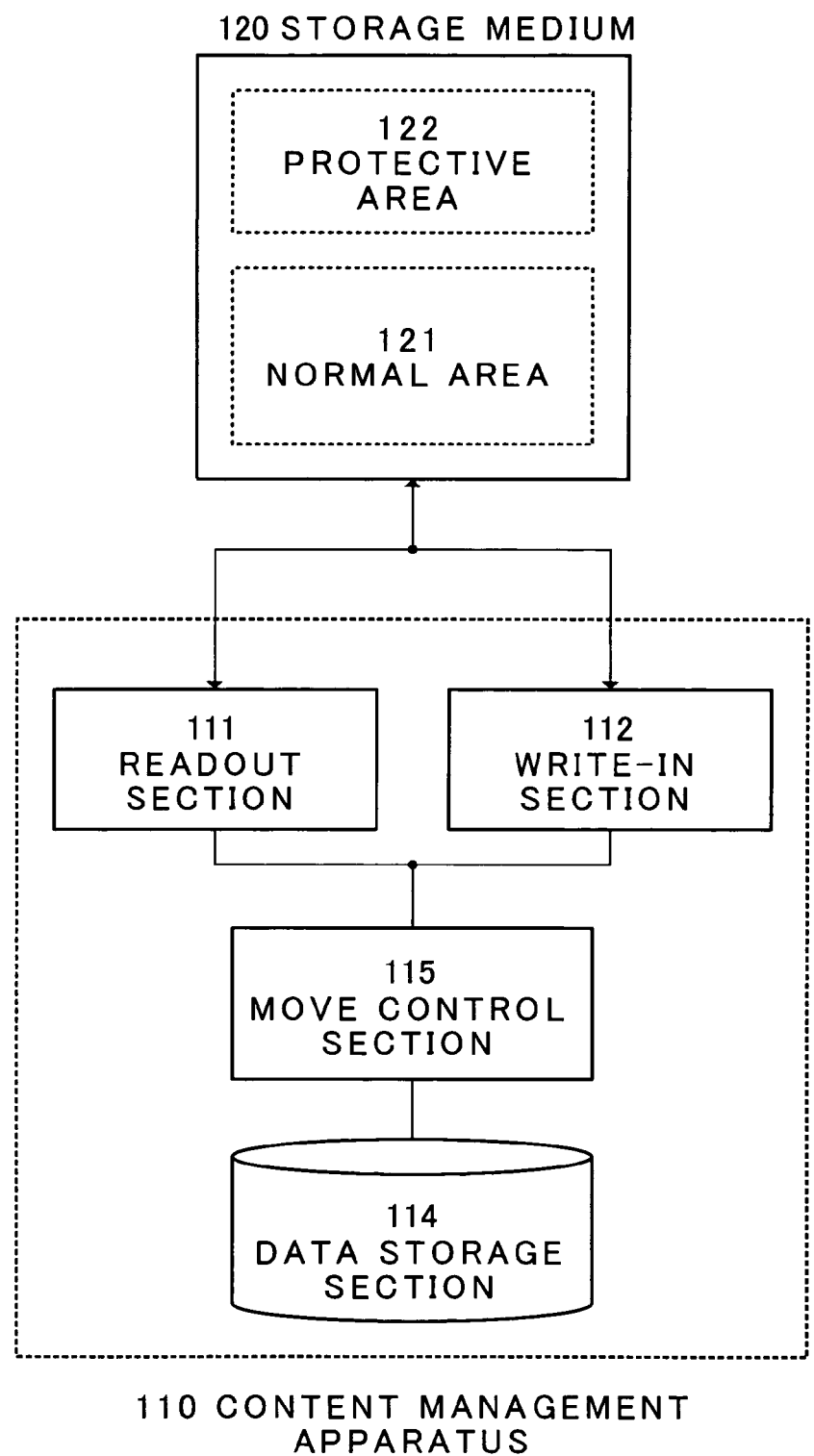
FIG. 11 is a configuration diagram of a content management system according to Embodiment 2 of the present invention.

According to this system, as illustrated in FIG. 11, content management apparatus 110 comprises move control section 115 that controls content move processing from content management apparatus 110 to storage medium 120, and content move processing from storage medium 120 to content management apparatus 110, in place of a copy control section. Except for that mentioned above, the configuration is the same as that of Embodiment 1 (FIG. 2).

The moving of content is managed based on additional information of the content in a similar manner as done in "copying" of Embodiment 1. When content is moved, additional information retained in a move source is subjected to updating in accordance with a predetermined rule to be transferred to a move destination, and moving thereafter is managed based on the updated additional information. For example, in a case where the content stored in data storage section 114 of content management apparatus 110 is moved to storage medium 120, the additional information stored in data storage section 114 of the move source is updated in accordance with the predetermined rule to be stored in protective area 122 of storage medium 120 of the move destination, and further moving of the content stored in storage medium 120 is managed based on the additional information stored in storage medium 120. Content management apparatus 110 at the move source does not get involved in the management of the content after moving at all.

This move processing according to additional information and updating processing of the additional information is executed by move control section 115 of content management apparatus 110. The operation of move control section 115 is implemented by a program for having a computer function as move control section 115.

Next, using a specific example, the $1^{st}$ content use model according to this embodiment and processing of a content management system with such a model is explained. The $1^{st}$ content use model is a model which limits the move count of content.

First of all, content management apparatus 110 acquires content and its additional information which are distributed with use of some means as done in Embodiment 1, and stores them securely into data storage section 114.

Figure 12:
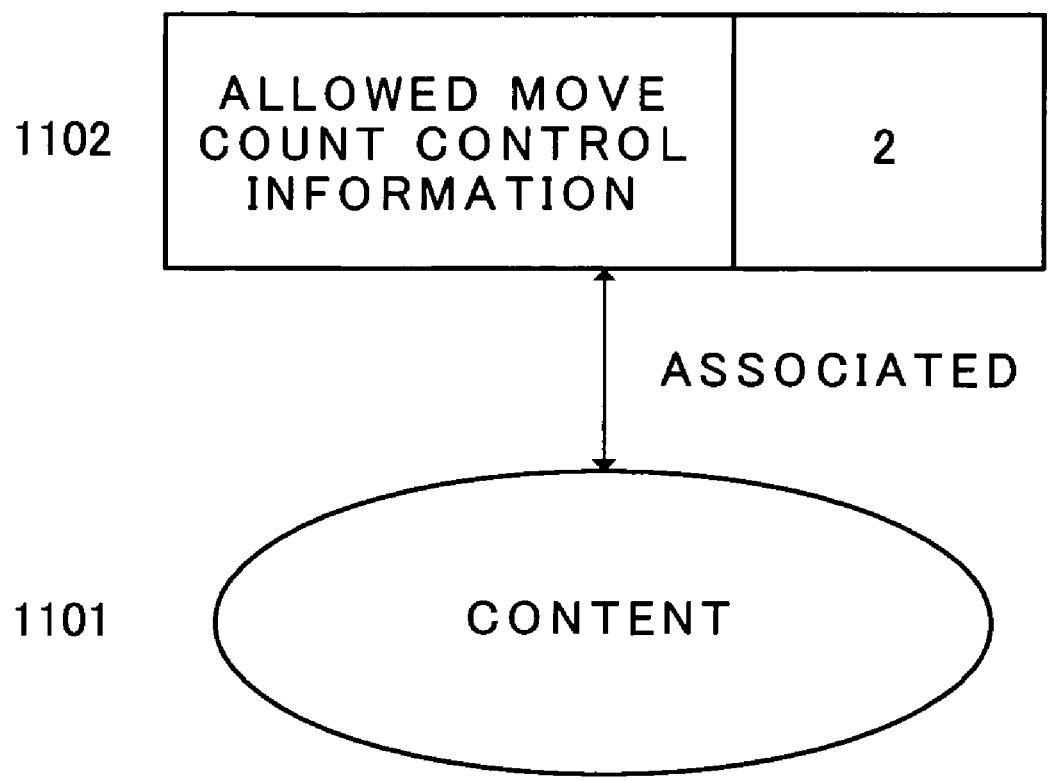
FIG. 12 is a diagram illustrating one example of content acquired by a content management apparatus and its additional information according to Embodiment 2 of the present invention.

FIG. 12 is a diagram illustrating one example of content 1101 and its additional information 1102 acquired by content management apparatus 110. The difference from Embodiment 1 lies in that allowed move count control information instead of allowed copy count control information is associated with content. The allowed move count control information is information which represents how many moves of the associated content are remaining to be allowed.

Figure 13:
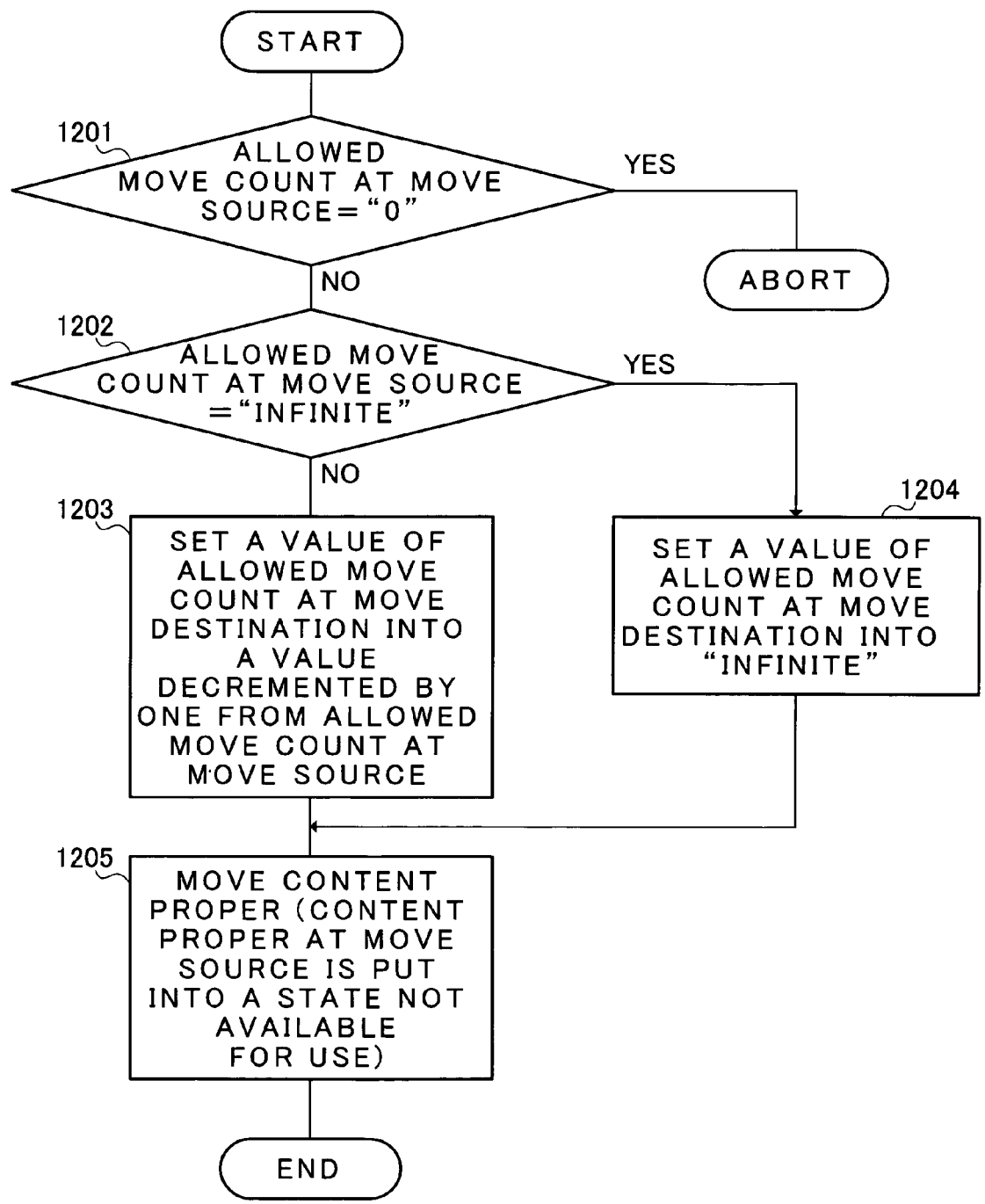
FIG. 13 is a diagram illustrating the processing flow of content moving at a copy control section according to Embodiment 2 of the present invention.

Next, an explanation is given on processing at move control section 115 in a case where instructions are given by a user for moving content 1101 stored in content management apparatus 110 to storage medium 120. FIG. 13 is a diagram illustrating the processing flow of content moving at move control section 115.

Step 1201: Allowed move count control information at a move source is referred to, and if the allowed move count is 0, the processing is aborted. In the case of this example, because the allowed move count associated with content 1101 is "2", the processing goes to step 1202 without aborting.

Step 1202: In a case where the allowed move count control information at the move source is "infinite", the processing goes to step 1204; otherwise it goes to step 1203. Because it is not a value indicating "infinite" in the case of this example, the processing goes to step 1203.

Step 1203: The allowed move count at the move destination is set into a value decremented by one from the allowed move count at the move source. In the case of this example, because the allowed move count at the move source is "2", the allowed move count at the move destination is set to be "1".

Step 1204: In a case where the allowed move count control information at the move source is "infinite" in step 1202, the value of the allowed move count control information at the move destination is also set as "infinite."

Step 1205: Content proper is moved to the move destination. In the case of this example, a copy of content 1101 stored in data storage section 114 of content management apparatus 110 is stored in normal area 121 of storage medium 120 which is the move destination, and original content 1101 stored in content management apparatus 110 which is the move source is put into a state not available for use permanently (e.g. deleted from data storage section 114). At such an occasion, as done in a case of copying, the move content is subjected to encryption for storage so that it will not be able to be used, moved, and exploited in other way, without due authorization. An encryption key used in such an occasion is stored in protective area 122.

Figure 14:
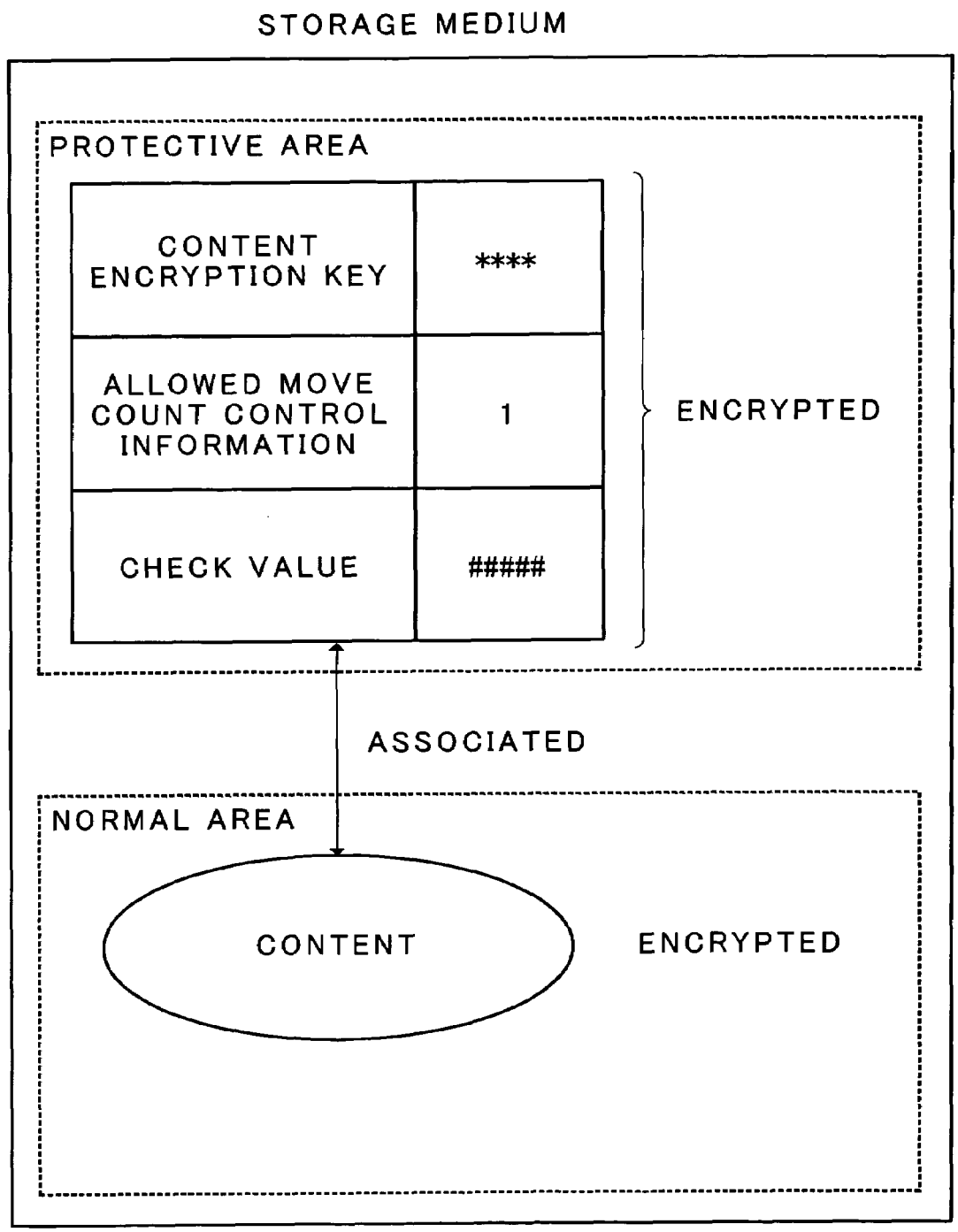
FIG. 14 is a diagram illustrating the structure of data stored in a storage medium after a move processing stage for a case of the $1^{st}$ content use model according to Embodiment 2 of the present invention.

FIG. 14 is a diagram illustrating the configuration of data stored in a storage medium after a move processing stage in this example. As done in Embodiment 1, it is also possible to enhance security against an attack from a malicious user by bringing the allowed move count control information and an encryption key for encrypting the content proper together and by encrypting them using an encryption key unique to the storage medium to store them into protective area 122. Moreover, at the time of encryption and storing into the protection area, it is possible to further heighten security by performing encryption and storage with a check value for detecting the tampering of information inserted therein.

Figure 15:
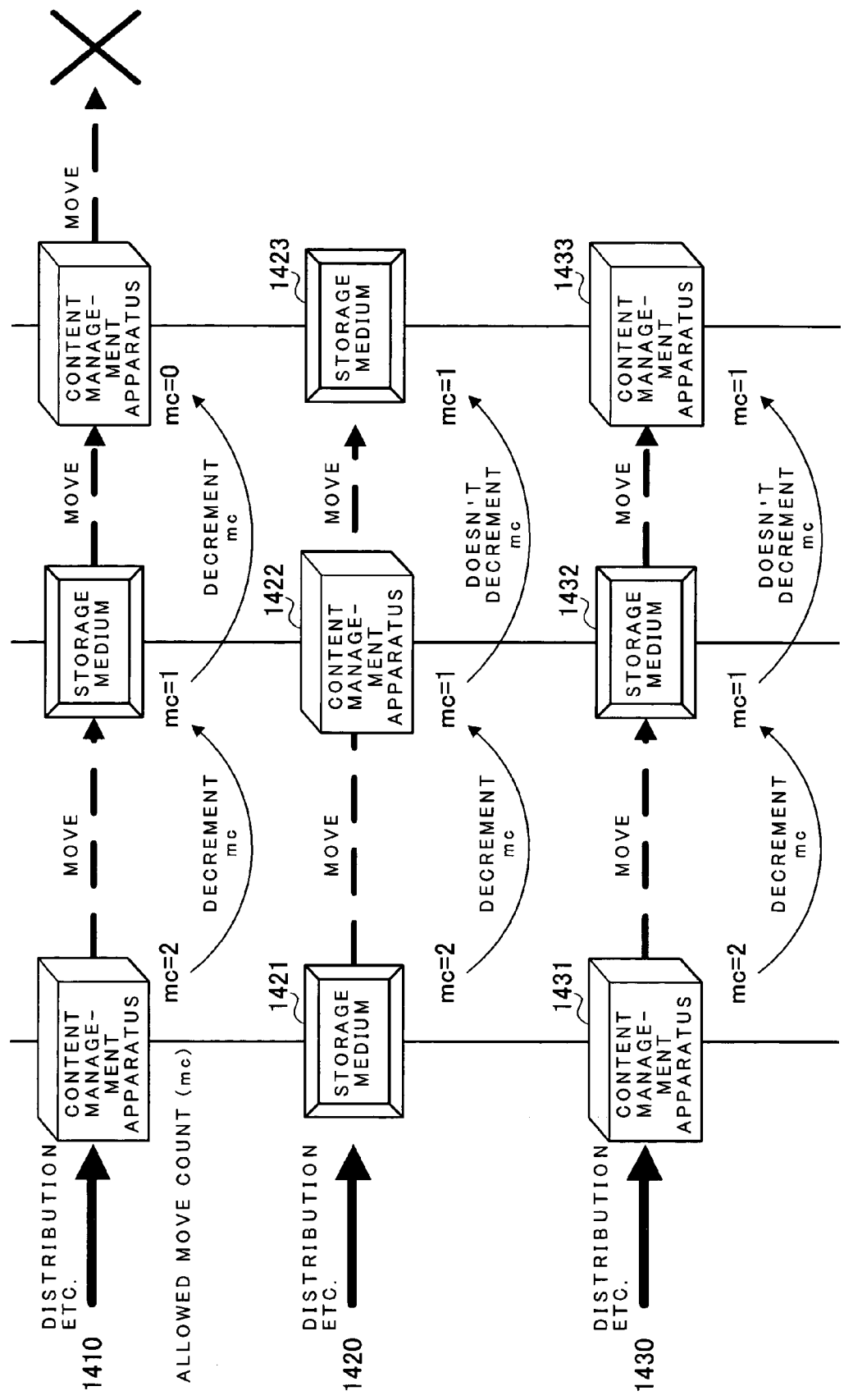
FIG. 15 is a conceptual diagram illustrating a content use model according to Embodiment 2 of the present invention.

Reference numeral 1410 in FIG. 15 shows a conceptual diagram of the $1^{st}$ content use model in this embodiment. As illustrated with reference numeral 1410 in FIG. 15, the $1^{st}$ content use model is a model which decrements the value of allowed move count at each moving of content, and disables moving thereafter at the time when the value of the allowed move count reaches to "0", which realizes the controlling of move counts of distributed content.

It is noted that, in the explanation given on the $1^{st}$ content use model of this embodiment, it is assumed that a content management apparatus is a move source, whereas a storage, medium is a move destination, however, it is also possible to implement move processing in which a storage medium is a move source, whereas a content management apparatus is a move destination, achieved with the flow illustrated in FIG. 13.

As described above, according to a content move processing flow illustrated in FIG. 13, though the content use model is assumed to be a model which decrements allowed move count both in cases where content is moved from a content management apparatus to a storage medium and where content is moved from a storage medium to a content management apparatus, it is possible to conceive another content use model (the $2^{nd}$ content use model in this embodiment) which, as illustrated with reference numeral 1420 in FIG. 15, decrements allowed move count in a case where content is moved from a storage medium to a content management apparatus only, without decrementing the allowed move count in a case where content is moved from a content management apparatus to a storage medium. In such a conception, it is regarded that one execution of move processing (rather than two times of executions) occurs when a move from storage medium 1421 to storage medium 1423 is completed while having content management apparatus 1422 serve as a bridge, and the conception thereby realizes a content use model which decrements allowed move count only by one.

In addition, opposite to the $2^{nd}$ content use model in this embodiment, it is possible to conceive further another content use model (the $3^{rd}$ content use model in this embodiment) which, as illustrated with reference numeral 1430 in FIG. 15, decrements allowed move count in a case where content is moved from a content management apparatus to a storage medium only, without decrementing the allowed move count in a case where content is moved from a storage medium to a content management apparatus. In such a conception, it is regarded that one execution of move processing, rather than two times of executions, occurs when a move from content management apparatus 1431 to content management apparatus 1433 is completed while having storage medium 1432 serve as a bridge, and the conception thereby realizes a content use model which decrements allowed move count only by one.

As described above, according to a system of this embodiment, it is possible to control the number of times of moving of distributed content by managing the allowed move count control information on the content and by setting the allowed move count in such a manner that it is decremented at each moving of the content.

On one hand, by decrementing allowed move count in a case where content is moved from a storage medium to a content management apparatus only, without decrementing the allowed move count in a case where content is moved from a content management apparatus to a storage medium, it becomes possible to realize a content use model which regards that one execution of move processing occurs at a time when a move from the first storage medium to the second storage medium is completed while having a content management apparatus serve as a bridge. On the other hand, by decrementing allowed move count in a case where content is moved from a content management apparatus to a storage medium only, without decrementing the allowed move count in a case where content is moved from a storage medium to a content management apparatus, it becomes possible to realize a content use model which regards that one execution of move processing occurs at a time when a move from the first content management apparatus to the second content management apparatus is completed while having a storage medium serve as a bridge.

It is noted that, though it is assumed in the explanation given in this embodiment that allowed move count control information is a counter whose value decreases at each time of moving, this may be implemented with a method in which the counter has two values, which are the maximum value and current value, where the current value is increased at each time of moving, and moving is then disabled at the time when the current value becomes equal to the maximum value. Furthermore, allowed move count control information may be flags indicating statuses, for example, indicating (1) move disabled (2) moving allowed only once (3) moving allowed infinitely, instead of a counter like the above.

Additionally, though the moving of content proper is performed at the last step according to the move processing flow illustrated in FIG. 13, the moving of the content proper may be performed at the first step. Even at such an occasion, the content is subjected to encryption for storage so that there is no risk of use, moving, and exploitation in other way without due authorization.

EMBODIMENT 3

In Embodiment 3, a content management system which manages the copying and moving of content is explained.

Figure 16:
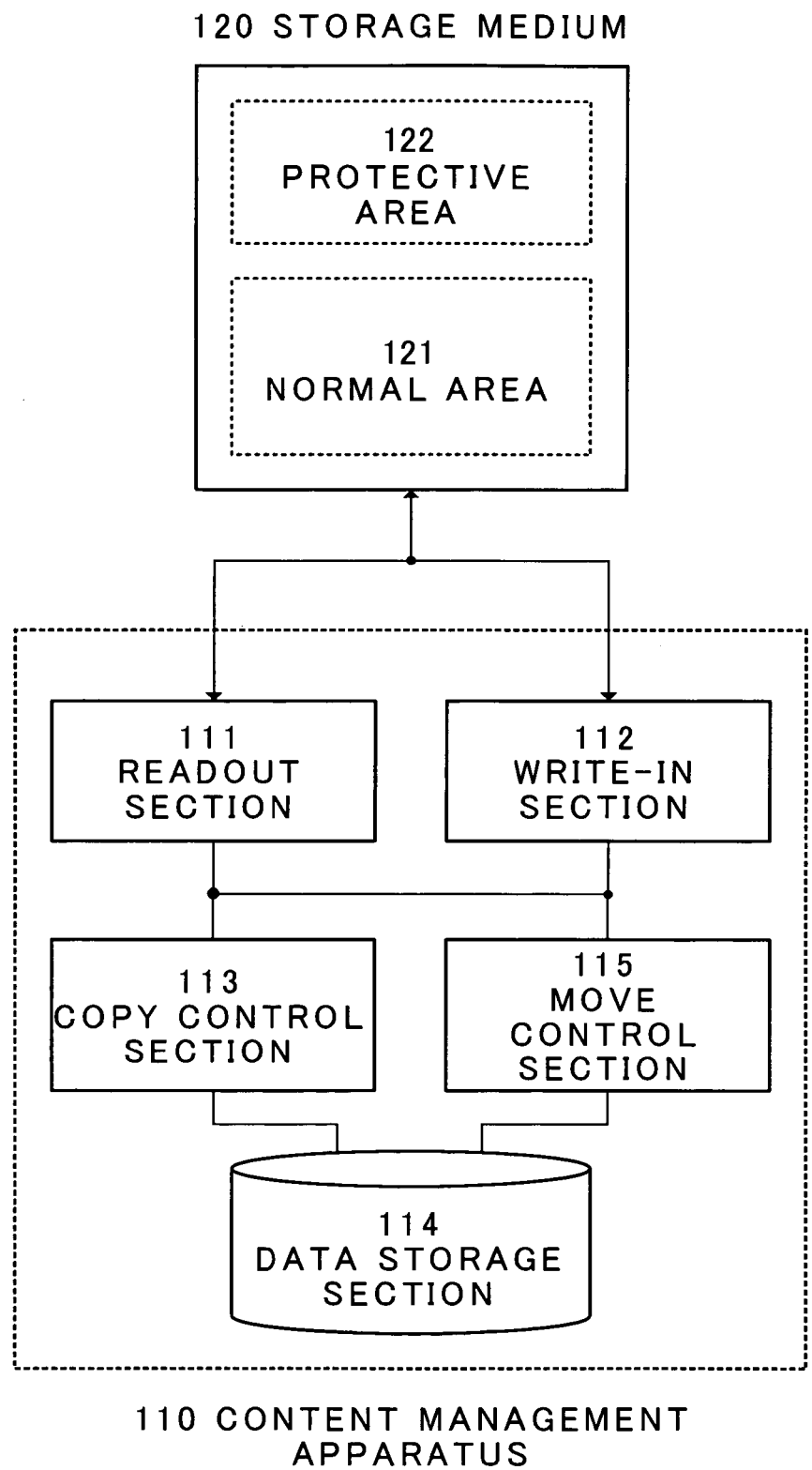
FIG. 16 is a configuration diagram of a content management system according to Embodiment 3 of the present invention.

As illustrated in FIG. 16, according to this system, content management apparatus 110 comprises both copy control section 113 and move control section 115. Except for that mentioned above, the configuration is the same as that of Embodiments 1 and 2 (FIG. 2, FIG. 11). In addition, copy control section 113 and move control section 115 perform the same functions as done in Embodiments 1 and 2 respectively.

Figure 17:
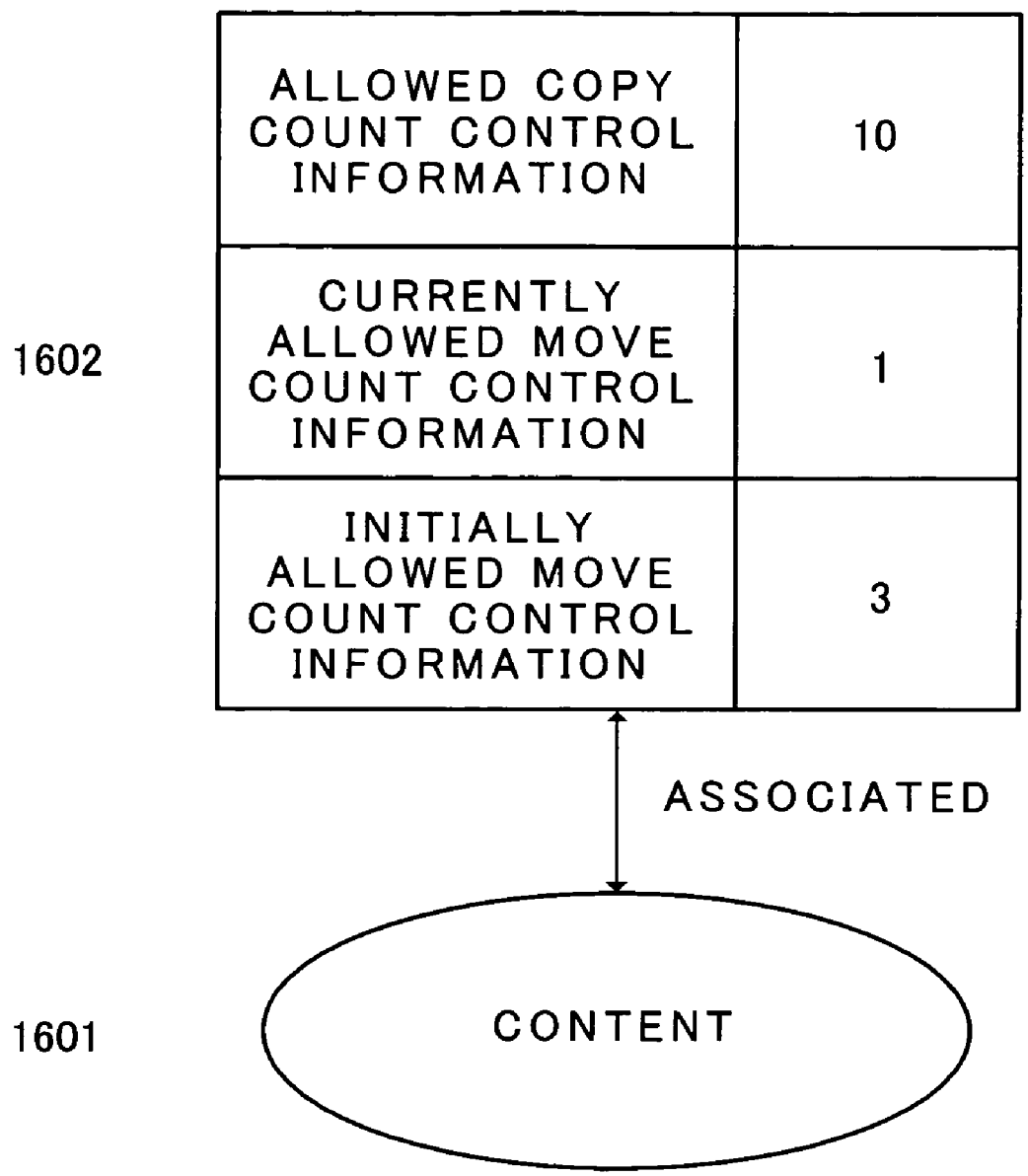
FIG. 17 is a diagram illustrating one example of content stored in a content management apparatus and its additional information for a case of the $1^{st}$ content use model according to Embodiment 3 of the present invention.

Next, using a specific example, the $1^{st}$ content use model according to this embodiment and processing of a content management system with such a model is explained. The $1^{st}$ content use model is a model in which copied content has the same allowed move count as that at the time of distribution. First of all, it is assumed that content 1601 and additional information 1602 illustrated in FIG. 17 is stored securely in content management apparatus 110. Additional information 1602 associated with content 1601 includes allowed copy count control information and allowed move count control information, where the allowed move count control information is made up of initially allowed move count control information and currently allowed move count control information. The initially allowed move count control information is allowed move count control information which is set at the time of content distribution (set initially), and after the distribution, its value stays constant regardless of repeated copying and moving. On the other hand, currently allowed move count control information is information of which value decreases after the distribution upon the occurrence of a move, which is substantially the same as allowed move count control information in Embodiment 2. In the case of this example, the allowed move count of content 1601 which is set at the time of distribution is three times, and after going through two times of move processing, the content is currently stored in content management apparatus 110.

Figure 18:
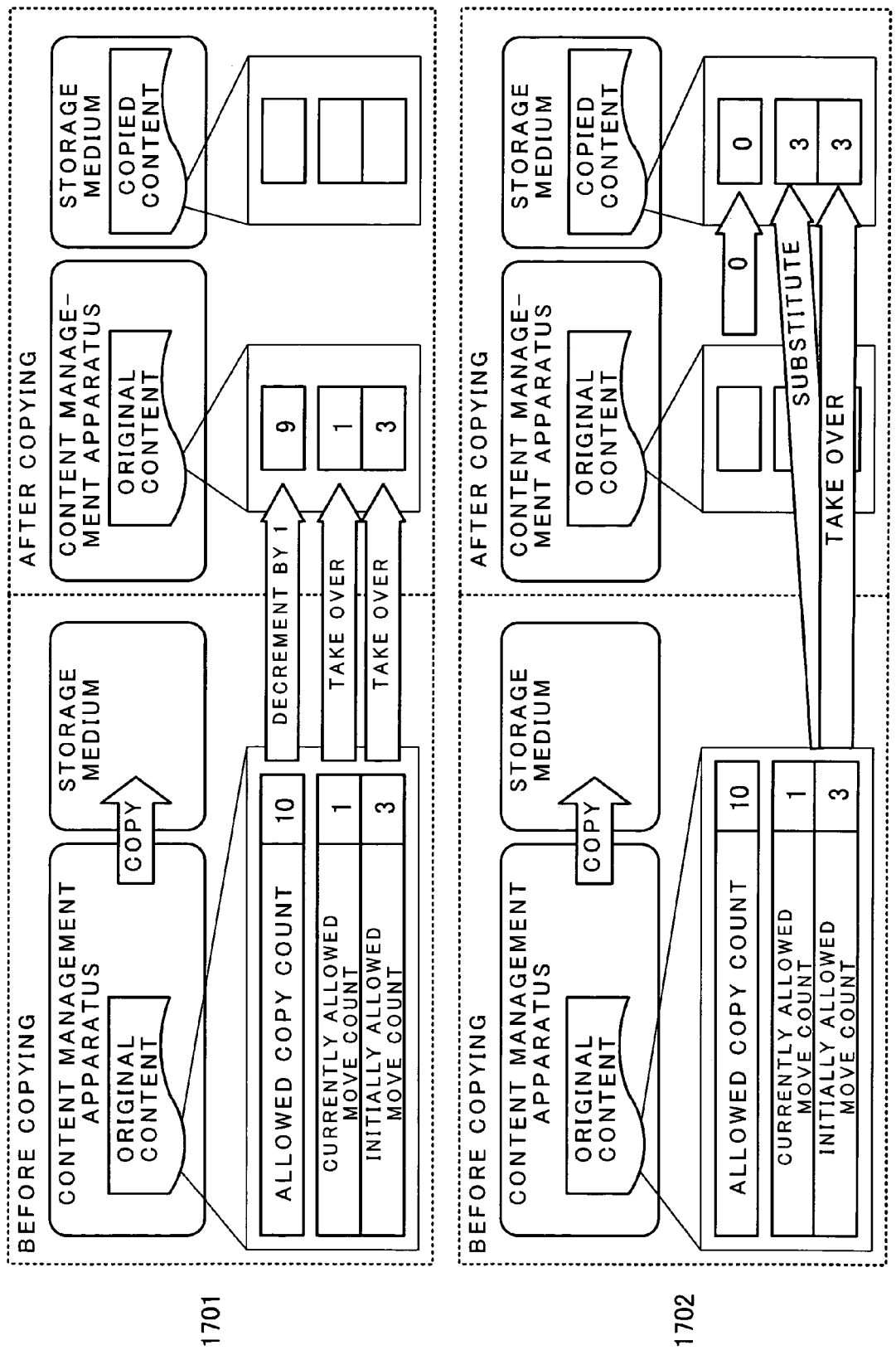
FIG. 18 is a diagram illustrating a setting example of the values of allowed copy count control information after copy processing, of initially allowed move count control information, and of currently allowed move count control information for a case of the $1^{st}$ content use model according to Embodiment 3 of the present invention.

Next, an explanation is given on a setting method of initially allowed move count control information and currently allowed move count control information at a copy target in a case where instructions are given by a user for copying content 1601 stored in content management apparatus 110 into storage medium 120. FIG. 18 is a diagram illustrating a setting example of the values of allowed copy count control information after copy processing, and of initially allowed move count control information and currently allowed move count control information after the same in the case of this example. As illustrated with reference numeral 1701 in FIG. 18, at the copy origin (content management apparatus), the values before copying are taken over without any change as initially allowed move count control information and currently allowed move count control information respectively, whereas allowed copy count control information is decremented by one.

On the other hand, as illustrated with reference numeral 1702 in FIG. 18, the value before copying is taken over without any change as initially allowed move count control information at the copy target (storage medium), whereas the value of the initially allowed move count control information at the copy origin is substituted into the currently allowed move count control information at the copy target. In addition, allowed copy count control information is set to be "0" (a model for disabling a sub-copy [the $1^{st}$ content use model in Embodiment 1])

In this way, it is possible to implement a content use model having the same conditions of allowed move count of copied content as those at the time of distribution thereof by substituting the initially allowed move count control information, which is allowed move count set at the time of the content distribution (set initially), into the currently allowed move count control information at the copy target.

It is noted that, though an explanation is given in FIG. 18 by taking an example of a content copy model which disables a sub-copy, other than such a model, this embodiment is also implementable in the same manner as with such a model by adopting any of all content copy models described in Embodiment 1.

In addition, it is also possible to implement another model which takes over a single value without any change at the time of copying in a case where allowed move count control information associated with content is not made up of two of initially allowed move count control information and currently allowed move count control information, but has only said single value.

Furthermore, though it is assumed in the explanation given herein that initially allowed move count control information and currently allowed move count control information are counters whose values decrease at each moving, these may not be such counters but may be flags indicating statuses, for example, indicating (1) move disabled (2) moving allowed only once (3) moving allowed infinitely.

Moreover, in a case where instructions are given by a user for moving content 1601 stored in content management apparatus 110 to storage medium 120, it is also possible to implement a model which takes over the value of allowed copy count control information at a move source as allowed copy count control information at a move destination. Moreover, even in a case where copy generation management information is associated with content, it is also implementable in the same way.

Next, the $2^{nd}$ content use model according to this embodiment and processing of a content management system with such a model is explained. The $2^{nd}$ content use model is a model which realizes quasi-copying of content from the $1^{st}$ storage medium to the $2^{nd}$ storage medium.

Figure 19:
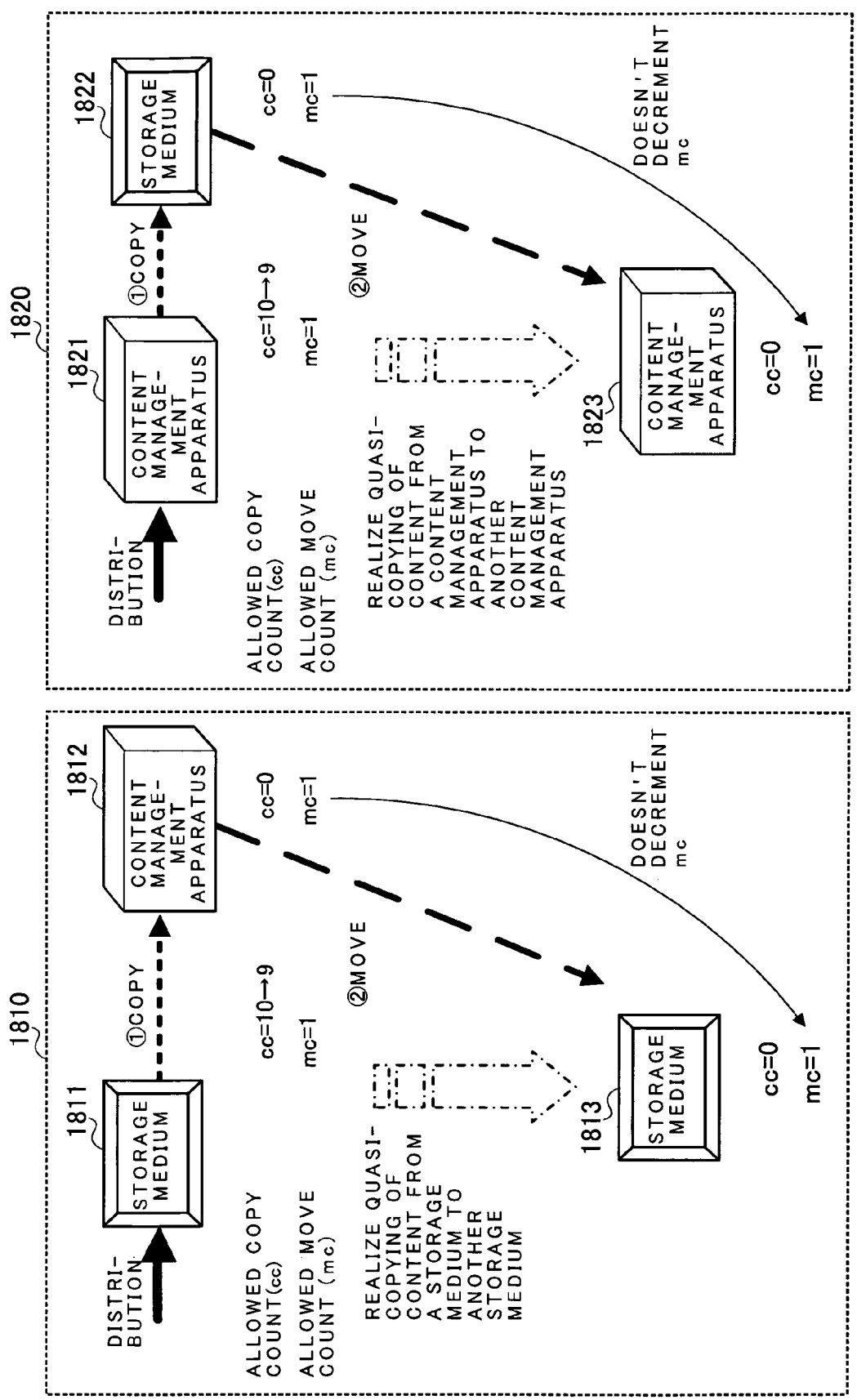
FIG. 19 is a conceptual diagram illustrating the $2^{nd}$ content use model according to Embodiment 3 of the present invention.

Reference numeral 1810 in FIG. 19 shows a conceptual diagram of the $2^{nd}$ content use model in this embodiment. In a content use model illustrated in conceptual diagram 19, it is assumed that content stored in storage medium 1811 is set with allowed copy count of "10" and allowed move count of "1." First of all, in accordance with the $1^{st}$ content use model in Embodiment 1 (a model which disables a sub-copy), this content is processed to be copied to content management apparatus 1812. Next, the copied content is processed to be moved to another storage medium 1813 which is other than storage medium 1811 in accordance with the $2^{nd}$ content use model in Embodiment 2. Herein, the allowed move count is not decreased by performing the moving processing in accordance with the $2^{nd}$ content use model in Embodiment 2. Consequently, the allowed copy count associated with the content stored in storage medium 1813 becomes "0", whereas the allowed move count therewith becomes "1", and therefore it is possible to provide the same situation as one where a direct copy is done from storage medium 1811 to storage medium 1813 by a model disabling a sub-copy.

This means that it is possible to realize the quasi-copying of content from the $1^{st}$ storage medium to the $2^{nd}$ storage medium even by using, for example, a content management apparatus having only one slot for reading/writing a storage medium, just in the same way as done by a content management apparatus having two slots which is able to copy content in a storage medium inserted in one slot to another storage medium inserted in the other slot.

It is noted that, though it is assumed in conceptual diagram 19 that copy processing is performed with a model disabling a sub-copy at the time of copying content from storage medium 1811 to content management apparatus 1812, other than that model, it is also implementable in the same manner as with such a model by adopting any of all content copy models described in Embodiment 1.

In addition, as illustrated with reference numeral 1820 in FIG. 19, it is possible to realize the quasi-copying of content from the $1^{st}$ content management apparatus 1821 to the $2^{nd}$ content management apparatus 1823 while having storage medium 1822 serve as a bridge by, firstly, performing copy processing from content management apparatus 1821 to storage medium 1822 in accordance with any of content copy models described in Embodiment 1, and next, by performing moving processing of the copied content to content management apparatus 1823 in accordance with the $3^{rd}$ content use model in Embodiment 2.

As described above, according to a system of this embodiment, it is possible to implement a content use model having the same conditions of allowed move count of copied content as those at the time of distribution thereof with a content management apparatus comprising both copy control section 113 and move control section 115, achieved by that such an apparatus manages copy-related control information on and move-related control information on content and further manages initially allowed move count control information and currently allowed move count control information as allowed move count control information, and by that the value of the initially allowed move count control information is substituted into the currently allowed move count control information at a copy target at the time of copy processing.

Furthermore, it is possible to realize the quasi-copying of content from the $1^{st}$ storage medium to the $2^{nd}$ storage medium by performing copy processing from the $1^{st}$ storage medium to a content management apparatus, and by performing the moving processing of the copied content to the $2^{nd}$ storage medium in such a manner that allowed move count is not decreased. Still furthermore, it is possible to realize the quasi-copying of content from the $1^{st}$ content management apparatus to the $2^{nd}$ content management apparatus by performing copy processing from the $1^{st}$ content management apparatus to a storage medium, and by performing the moving processing of the copied content to the $2^{nd}$ content management apparatus in such a manner that allowed move count is not decreased.

EMBODIMENT 4

In Embodiment 4, an explanation is given on copy processing and move processing for a case where use restriction information is associated with content.

The configuration diagram of this content management system may be any of configuration diagrams in Embodiments 1 through 3 (FIG. 2, FIG. 11, and FIG. 16).

With a specific example, a content use model according to this embodiment and processing of a content management system with such a model is explained below.

Figure 20:
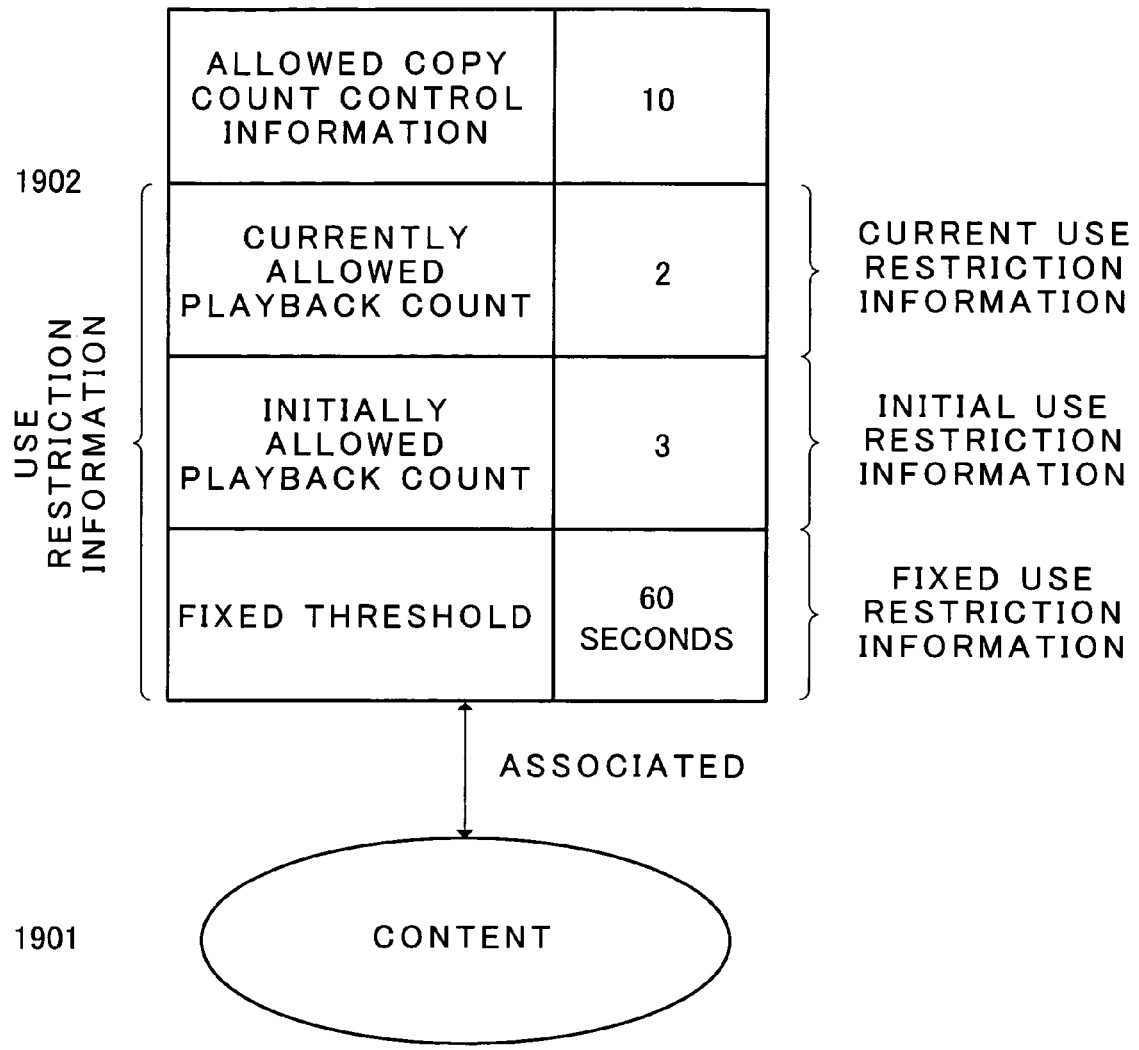
FIG. 20 is a diagram illustrating one example of content stored in a content management apparatus and its additional information according to Embodiment 4 of the present invention.

First of all, it is assumed that content 1901 and additional information 1902 illustrated in FIG. 20 is stored securely in content management apparatus 110. The difference herein from the example of content and its additional information described in Embodiment 1 is that use restriction information, in addition to allowed copy count control information, is further associated with content. Moreover, use restriction information is made up of current use restriction information, initial use restriction information, and fixed use restriction information. In the same manner as in the relation between currently allowed move count control information and initially allowed move count control information according to Embodiment 3, the relation between current use restriction information and initial use restriction information can be described in such a way that the current use restriction information varies its use restriction value as content playback is executed after distribution, while the initial use restriction information is use restriction information set at the time of content distribution.

As a specific example, in FIG. 20, the current value and the initial value of use restriction related to allowed playback count are associated with content. In the case of this example, the allowed playback count of content 1901 which is set at the time of distribution is three times, and after going through one execution of playback processing, the content is currently stored in content management apparatus 110 in the status of remaining two times of allowed playback executions.

In addition, fixed use restriction information is use restriction information of which value does not change even when content is played back. As a specific example, in FIG. 20, use restriction related to a threshold is associated with content. Here, the threshold is information for decrementing the allowed playback count by one (regards as one execution of playback) upon the elapsing of a certain time period specified by said threshold after starting of content playback. It is noted that, an allowed playback count and a threshold is mentioned as an example set of use restriction information in FIG. 20, however, the use restriction information may be any other kinds of information.

Figure 21:
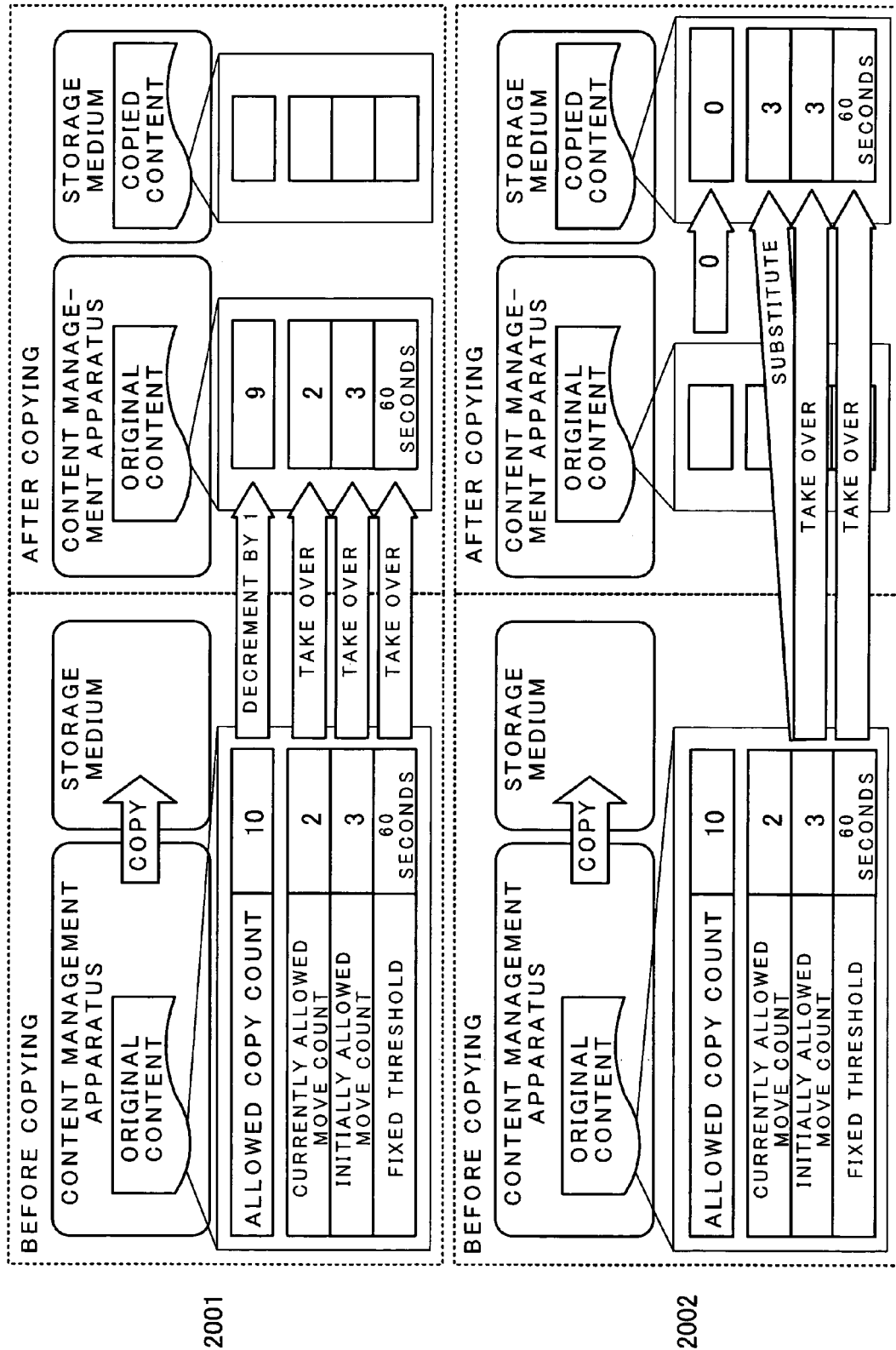
FIG. 21 is a diagram illustrating a setting example of the values of allowed copy count control information after copy processing, and of use restriction information according to Embodiment 4 of the present invention.

Next, an explanation is given regarding a setting method of use restriction information at a copy target in a case where instructions are given by a user for copying content 1901 stored in content management apparatus 110 into storage medium 120. FIG. 21 is a diagram illustrating a setting example of the values of allowed copy count control information after copy processing, and of use restriction information according to an example of this case. As illustrated with reference numeral 2001 in FIG. 21, at the copy origin (content management apparatus), the values before copying are taken over without any change as three kinds of use restriction information, whereas allowed copy count control information is decremented by one. On the other hand, as illustrated with reference numeral 2002 in FIG. 21, the values before copying are taken over without any change as the initial use restriction information (initially allowed playback count) and the fixed use restriction information (fixed threshold) at the copy target (storage medium), whereas the value of the initial use restriction information (initially allowed playback count) at the copy origin is substituted into the current use restriction information (currently allowed playback count) at the copy target. In addition, the allowed copy count control information is set to be "0" (a model for disabling a sub-copy [the $1^{st}$ content use model in Embodiment 1]).

In this way, it is possible to implement a content use model having the same conditions of use restriction information of copied content as those at the time of distribution by substituting the initial use restriction information, which is use restriction information set at the time of the content distribution (set initially), into the current use restriction information at the copy target, while taking over the values before copying without any change for other use restriction information.

It is noted that, though an explanation is given in FIG. 21 by taking an example of a content copy model which disables a sub-copy, other than such a model, this embodiment is also implementable in the same manner as with such a model by adopting any of all content copy models described in Embodiment 1.

In addition, it is also possible to implement another content use model which takes over each value without any change at the time of copying in a case where use restriction information associated with content is not made up of initial use restriction information, current use restriction information, and fixed use restriction information, in other words, in a case where use restriction information does not have initial use restriction information.

Moreover, in a case where instructions are given by a user for moving content 1901 stored in content management apparatus 110 to storage medium 120, it is also possible to implement a content use model which takes over each value of use restriction information at a move source as each use restriction information at a move destination.

In addition, in the example of FIG. 20, though additional information associated with content is allowed copy count control information and use restriction information only, copy generation management information and allowed move count control information may be associated therewith.

As described above, according to a system of this embodiment, it is possible to implement a content use model having the same conditions of use restriction information of copied content as those at the time of distribution thereof, achieved by that use restriction information on content is managed, where the use restriction information is made up of current use restriction information, initial use restriction information, and fixed use restriction information, and that the value of the initial use restriction information is substituted into the current use restriction information at the copy target at the time of copy processing.

As made clear from the foregoing descriptions, according to the present invention, additional information of content is updated at the time of the copying and moving of the content, and the management of the copying and moving of the content thereafter is done by equipment which handles the content based on the updated additional information. For that reason, the necessity for complex management such as check-ins according to the conventional scheme is obviated, making it possible to achieve content management easily understandable for users.

In addition, it is possible to implement a content use model which disables a sub-copy, or a content use model which manages the aggregate number of copies.

Moreover, it is possible to implement a content use model which regards that one execution of move processing occurs at a time when a move from the first storage medium to the second storage medium is completed with a content management apparatus functioning as a bridge, or a content use model which regards that one execution of move processing occurs at a time when a move from the first content management apparatus to the second content management apparatus is completed with a storage medium functioning as a bridge.

Furthermore, it is possible to implement a content use model which sets the conditions of allowed move count of copied content as those at the time of distribution thereof, a content use model which does the quasi-copying content from the $1^{st}$ storage medium to the $2^{nd}$ storage medium, or a content use model which does the quasi-copying content from the $1^{st}$ content management apparatus to the $2^{nd}$ content management apparatus.

In addition, it is possible to implement a content use model which makes the conditions of use restriction information of copied content as those at the time of distribution thereof.

This specification is based on the Japanese Patent Application No. 2001-206491 filed on Jul. 6, 2001, entire content of which is expressly incorporated by reference herein.

INDUSTRIAL APPLICABILITY

The present invention is suitably applicable to a system in which content is downloaded to a handset such as a cellular phone, etc., and the downloaded content is stored in a storage medium connected to the handset for use.

What is claimed is:

1. A content management method for managing moving of content, the method comprising:
    moving the content from a source to a destination, with reference to allowed move count control information of the content retained at the source, wherein the allowed move count control information indicates a remaining number of times that moving of the content is allowed;
    updating the allowed move count control information, such that when the content is moved from a first storage medium to a content management apparatus and then the content is moved from the content management apparatus to a second storage medium, the allowed move count control information is updated so that the allowed move count is decremented only in one of a first moving process from the first storage medium to the content management apparatus and a second moving process from the content management apparatus to the second storage medium; and
    setting the updated allowed move count information to the moved content.

2. The content management method according to claim 1, wherein, in the first moving process, the allowed move count control information is updated so that the allowed move count at the destination becomes smaller than the allowed move count of the source; and
    in the second moving process, the allowed move count control information is updated so that the allowed move count at the destination is set to have a same value as a value of the allowed move count of the source.

3. The content management method according to claim 1, wherein, in the first moving process, the allowed move count control information is updated so that the allowed move count at the destination is set to have a same value as a value of the allowed move count of the source; and
    in the second moving process, the allowed move count control information is updated so that the allowed move count at the destination becomes smaller than the allowed move count of the source.

4. A content management method for managing copying and moving of content, the method comprising:
    copying the content from a source to a destination with reference to additional information of the content retained at the source, wherein the additional information includes allowed copy count control information, currently allowed move count control information and initially allowed move count control information; and
    generating the additional information of the copied content so that the currently allowed move count at the destination is set to have a same value as the initially allowed move count at the source, wherein a number of times of moving is limited to a value of the currently allowed move count.

5. The content management method according to claim 4, wherein the additional information of the copied content is generated so that: the initially allowed move count at the destination is set to have a same value as a value of the initially allowed move count of the source.

6. A content management method for managing copying and moving of content, the method comprising:
    copying the content from a source to a destination with reference to additional information of the content retained at the source, wherein the additional information includes allowed copy count control information, currently allowed move count control information and initially allowed move count control information;
    generating the allowed copy count control information of the copied content at the destination based on the allowed copy count control information of the content retained at the source, wherein a copying process of the content thereinafter at the source and at the destination is performed with reference to each allowed copy count control information; and
    generating the currently allowed move count control information of the copied content so that the currently allowed move count at the destination is set to have a same value as a value of the initially allowed move count at the source, wherein a number of times of moving is limited to a value of the currently allowed move count.

7. The content management method according to claim 6, wherein the additional information of the copied content is generated so that:
    the initially allowed move count at the destination is set to have a same value as a value of the initially allowed move count at the source; and the currently allowed move count at the destination is set to have a same value as a value of the initially allowed move count at the source.

8. A content management method for managing copying and moving of content, the method comprising:

copying content from a copy source to a copy destination with reference to additional information of the content retained at the move source, wherein the additional information includes an allowed copy count control information, a currently allowed move count control information and an initially allowed move count control information;

setting the allowed copy count control information of the copied content which is to be retained at the copy destination, so as to indicate that copying of the copied content is not allowed; and generating the currently allowed move count control information of the copied content so that the currently allowed move count at the copy destination is set to have a same value as a value of the initially allowed move count at the copy source, wherein a number of times of moving is limited to a value of the currently allowed move count.

9. The content management method according to claim 8, wherein the additional information of the copied content is generated so that:

the initially allowed move count at the copy destination is set to have a same value as a value of the initially allowed move count at the source.

10. A content management method for managing copying and moving of content, the method comprising:

copying the content from a first storage medium as a copy source to a content management apparatus as a copy destination with reference to an allowed copy count control information of the content retained at the copy source;

moving the copied content from the content management apparatus as a move source to a second storage medium as a move destination; and setting an allowed move count control information of the moved content so that an allowed move count at the move destination is set have a same value as a value of the allowed move count at the move source, wherein a number of times of moving is limited to the value of the allowed move count.

11. The content management method according to claim 10, wherein, when the content is copied from the first storage medium to the content management apparatus, setting the allowed copy count control information of the copied content which is to be retained at the content management apparatus, so as to indicate that copying of the copied content is not allowed.

12. A content management method for managing copying and moving of content, the method comprising:

copying the content from a first content management apparatus as a copy source to a storage medium as a copy destination with reference to an allowed copy count control information of the content retained at the copy source;

moving the copied content from the storage medium as a move source to a second content management apparatus as a move destination; and setting an allowed move count control information of the moved content so that an allowed move count at the move destination is set have a same value as a value of the allowed move count at the move source, wherein a number of times of moving is limited to the value of the allowed move count.

13. The content management method according to claim 12, wherein, when the content is copied from the first content management apparatus to the storage medium, setting the allowed copy count control information of the copied content which is to be retained at the storage medium, so as to indicate that copying of the copied content is not allowed.

14. A content management method for managing copying of content, the method comprising:

copying the content from a source to a destination with reference to an allowed copy count control information of the content retained at the source, wherein the allowed copy count control information indicates how many copies of the content are allowed to be made; and generating use restriction information of the copied content so that the use restriction information at the destination is set to have a same value as a value of initial use restriction information at the source, wherein the use restriction information includes current use restriction information, initial use restriction information and fixed use restriction information, wherein the use restriction information of the copied content is generated so that:

each value of the initial use restriction information and the fixed use restriction information at the destination is set to have a same value as the values of the initial use restriction information and the fixed use restriction information of the source; and the current use restriction information at the destination is set to have a same value as the value of the initial use restriction information at the source.

15. A content management method for managing copying of content, the method comprising:

copying the content from a source to a destination with reference to allowed copy count control information of the content retained at the source, wherein the allowed copy count control information indicates how many copies of the content are allowed to be made;

generating allowed copy count control information of the copied content at the destination based on the allowed copy count control information of the content retained at the source, wherein copying of the content at the source and at the destination is performed with reference to each allowed copy count control information; and generating use restriction information of the copied content so that the use restriction information at the destination is set to have a same value as an initial use restriction information at the source, wherein the use restriction information includes current use restriction information, initial use restriction information and fixed use restriction information, wherein the use restriction information of the copied content is generated so that:

each value of the initial use restriction information and the fixed use restriction information at the destination is set to have a same value as the values of the initial use restriction information and the fixed use restriction information of the source; and the current use restriction information at the destination is set to have a same value as the value of the initial use restriction information at the source.

16. The content management method according to claim 6, wherein the allowed copy count control information is retained in a secure tamper-resistant state in the content management apparatus and the storage medium.

17. The content management method according to claim 6, wherein the allowed copy count control information is stored in protected area in the content management apparatus and the storage medium.

18. The content management method according to claim 6, wherein the allowed copy count control information is stored after being subjected to encryption in the content management apparatus and the storage medium.

19. The content management method according to claim 6, wherein the allowed copy count control information is stored in a state containing a value for detecting the tampering of information in the content management apparatus and the storage medium.

20. The content management method according to claim 4, wherein, when content is copied from an original to a target, the allowed copy count control information to be retained at the target is set into information indicating that copying is disabled.

21. The content management method according to claim 14, wherein, when content is copied from an original to a target, the allowed copy count control information to be retained at the target is set into information indicating that copying is disabled.

22. The content management method according to claim 14, wherein the allowed copy count control information is retained in a secure tamper-resistant state in the content management apparatus and the storage medium.

23. The content management method according to claim 22, wherein the allowed copy count control information is stored in protected area in the content management apparatus and the storage medium.

24. The content management method according to claim 22, wherein the allowed copy count control information is stored after being subjected to encryption in the content management apparatus and the storage medium.

25. The content management method according to claim 22, wherein the allowed copy count control information is stored in a state containing a value for detecting the tampering of information in the content management apparatus and the storage medium.

* * * * *